United States Patent
Toyoda et al.

(10) Patent No.: US 9,841,124 B2
(45) Date of Patent: Dec. 12, 2017

(54) HIGH-STRENGTH THICK-WALLED ELECTRIC RESISTANCE WELDED STEEL PIPE HAVING EXCELLENT LOW-TEMPERATURE TOUGHNESS AND METHOD OF MANUFACTURING THE SAME

(71) Applicant: JFE Steel Corporation, Tokyo (JP)

(72) Inventors: Shunsuke Toyoda, Kawasaki (JP); Sota Goto, Chita (JP); Takatoshi Okabe, Chita (JP); Tomohiro Inoue, Chita (JP); Motoharu Egi, Chita (JP); Atsushi Yonemoto, Chita (JP)

(73) Assignee: JFE Steel Corporation (JP)

( * ) Notice: Subject to any disclaimer, the term of this patent is extended or adjusted under 35 U.S.C. 154(b) by 620 days.

(21) Appl. No.: 14/394,163

(22) PCT Filed: Apr. 11, 2013

(86) PCT No.: PCT/JP2013/002488
§ 371 (c)(1),
(2) Date: Oct. 13, 2014

(87) PCT Pub. No.: WO2013/153819
PCT Pub. Date: Oct. 17, 2013

(65) Prior Publication Data
US 2015/0083266 A1    Mar. 26, 2015

(30) Foreign Application Priority Data

Apr. 13, 2012    (JP) .................. 2012-092045

(51) Int. Cl.
*F16L 9/02*    (2006.01)
*F16L 9/17*    (2006.01)
(Continued)

(52) U.S. Cl.
CPC .............. *F16L 9/02* (2013.01); *B21B 3/00* (2013.01); *B21B 27/08* (2013.01); *B21C 37/08* (2013.01);
(Continued)

(58) Field of Classification Search
CPC ....... C22C 38/14; C22C 38/58; C22C 38/001; C22C 38/16; C22C 38/002; C22C 38/02;
(Continued)

(56) References Cited

FOREIGN PATENT DOCUMENTS

| CA | 2 679 623 | 11/2008 |
|---|---|---|
| EP | 2 295 615 | 3/2011 |

(Continued)

OTHER PUBLICATIONS

Machine Translation, Watanabe et al., JP 2004-084068, Mar. 2004.*
(Continued)

*Primary Examiner* — Michael E La Villa
(74) *Attorney, Agent, or Firm* — DLA Piper LLP (US)

(57) ABSTRACT

A high-strength thick-walled electric resistance welded steel pipe has excellent low-temperature toughness and excellent HIC resistance and a yield strength of 400 MPa or more. The steel has a chemical composition consisting of C: 0.025% to 0.084%, Si: 0.10% to 0.30%, Mn: 0.70% to 1.80%, controlled amounts of P, S, Al, N, and O, Nb: 0.001% to 0.065%, V: 0.001% to 0.065%, Ti: 0.001% to 0.033%, and Ca: 0.0001% to 0.0035% on a mass percent basis and the remainder being Fe and incidental impurities, and satisfies Pcm of 0.20 or less.

8 Claims, 2 Drawing Sheets

(51) Int. Cl.
| | |
|---|---|
| B21C 37/08 | (2006.01) |
| B23K 11/087 | (2006.01) |
| B23K 11/00 | (2006.01) |
| B21B 27/06 | (2006.01) |
| B32B 1/08 | (2006.01) |
| B21B 3/00 | (2006.01) |
| C21D 8/02 | (2006.01) |
| C21D 9/08 | (2006.01) |
| C21D 1/00 | (2006.01) |
| C22C 38/14 | (2006.01) |
| C22C 38/58 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/16 | (2006.01) |
| B21B 27/08 | (2006.01) |
| C21D 9/50 | (2006.01) |
| C21D 8/10 | (2006.01) |

(52) U.S. Cl.
CPC ...... *B23K 11/0073* (2013.01); *B23K 11/0873* (2013.01); *B32B 1/08* (2013.01); *C21D 1/00* (2013.01); *C21D 8/02* (2013.01); *C21D 8/0226* (2013.01); *C21D 8/0263* (2013.01); *C21D 9/08* (2013.01); *C21D 9/085* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/58* (2013.01); *F16L 9/17* (2013.01); *C21D 8/105* (2013.01); *C21D 9/50* (2013.01); *C21D 2211/005* (2013.01); *Y10T 428/12958* (2015.01); *Y10T 428/12965* (2015.01); *Y10T 428/12972* (2015.01); *Y10T 428/12979* (2015.01); *Y10T 428/13* (2015.01)

(58) Field of Classification Search
CPC ......... C22C 38/04; C22C 38/06; C22C 38/08; C22C 38/12; C22C 38/18; C22C 38/20; C22C 38/22; C22C 38/24; C22C 38/26; C22C 38/28; C22C 38/40; C22C 38/42; C22C 38/44; C22C 38/46; C22C 38/48; C22C 38/00; C22C 38/38; C22C 38/30; B32B 1/08; B32B 15/00; B32B 15/01; B32B 15/011; B32B 15/04; B32B 15/18; B32B 15/043; Y10T 428/12958; Y10T 428/12965; Y10T 428/13; Y10T 428/12972; Y10T 428/12979
See application file for complete search history.

(56) References Cited

FOREIGN PATENT DOCUMENTS

| | | |
|---|---|---|
| EP | 2 868 765 | 5/2015 |
| JP | 59-35629 | 2/1984 |
| JP | 01-58253 | 12/1989 |
| JP | 3-60888 | 3/1991 |
| JP | 7-42509 | 2/1995 |
| JP | 2004-084068 | * 3/2004 |
| JP | 2007-119899 | 5/2007 |
| JP | 2011-246793 | 12/2011 |

OTHER PUBLICATIONS

Canadian Office Action dated Feb. 25, 2016 of corresponding Canadian Application No. 2,869,879.

Supplementary European Search Report dated Jul. 14, 2015 of corresponding European Application No. 13775345.5.

* cited by examiner

HIGH-STRENGTH THICK-WALLED ELECTRIC RESISTANCE WELDED STEEL PIPE HAVING EXCELLENT LOW-TEMPERATURE TOUGHNESS AND METHOD OF MANUFACTURING THE SAME

TECHNICAL FIELD

This disclosure relates to a high-strength thick-walled electric resistance welded steel pipe and more particularly to an improvement in the reliability of an electric resistance welded portion. The term "high-strength", as used herein, refers to a yield strength YS of 400 MPa or more. The term "thick-walled", as used herein, refers to a thickness of 16 to 32 mm.

BACKGROUND

Electric resistance welded steel pipes are used to drill or transport oil or natural gas. However, because of their low reliability due to low toughness of electric resistance welded portions, the electric resistance welded steel pipes are only used for applications that do not require severe specifications with respect to low-temperature toughness and resistance to hydrogen induced cracking (hereinafter also referred to as HIC)

To address such a problem, for example, Japanese Examined Patent Application Publication No. 01-58253 discloses a method of manufacturing a high-strength electric resistance welded steel pipe having excellent low-temperature toughness that includes performing electric resistance welding of a steel sheet having a predetermined chemical composition, heating the electric resistance welded portion at a temperature in the range of 790° C. to 1050° C. for at least 5 seconds, and rapidly cooling the electric resistance welded portion at a temperature of 770° C. to 890° C. at a cooling rate of 30° C./s to 150° C./s, thereby forming an electric resistance welded portion having a fine acicular ferrite microstructure. However, the steel sheet used in Japanese Examined Patent Application Publication No. 01-58253 has a small thickness of approximately 8.0 mm. Furthermore, the electric resistance welded portion of the steel pipe thus manufactured has a fracture (appearance) transition temperature of approximately −40° C. at most and, therefore, the low-temperature toughness of the electric resistance welded portion is not significantly improved. Japanese Examined Patent Application Publication No. 03-60888 discloses a method of manufacturing a high-strength electric resistance welded steel pipe having excellent low-temperature toughness that includes performing electric resistance welding of a steel sheet having a predetermined chemical composition, heating the electric resistance welded portion at a temperature of 790° C. to 1050° C. for at least 5 seconds, rapidly cooling the electric resistance welded portion at a temperature of 750° C. to 950° C. at a cooling rate of 30° C./s to 150° C./s, thereby forming an electric resistance welded portion having a fine acicular ferrite microstructure, and heating the electric resistance welded portion at a temperature of 400° C. to 700° C. for 1 minute or less to perform a stress relief heat treatment.

Japanese Examined Patent Application Publication No. 07-42509 discloses a method of manufacturing a high-strength electric resistance welded steel pipe having excellent low-temperature toughness that includes performing electric resistance welding of a steel sheet having a predetermined chemical composition, heating the electric resistance welded portion at a temperature of 850° C. to 1000° C., rapidly cooling the electric resistance welded portion from the Ar3 transformation point or higher to a finish cooling temperature in the range of (Ar1 transformation point−50° C.) to (Ar1 transformation point−100° C.) at a cooling rate of more than 30° C./s to 100° C./s, and performing weak cooling of the electric resistance welded portion.

However, application of the method disclosed in Japanese Examined Patent Application Publication No. 03-60888 to a thick-walled electric resistance welded steel pipe having a thickness of more than 20 mm requires a huge furnace for stress relief (stress removal) heat treatment, thus causing a economical problem. In the application of the method disclosed in Japanese Examined Patent Application Publication No. 07-42509 to a thick-walled electric resistance welded steel pipe having a thickness of more than 20 mm, it is difficult to heat the thick-walled electric resistance welded steel pipe from the outer surface thereof so that the central portion temperature in the direction of thickness of pipe is 850° C. to 1000° C.

It could therefore be helpful to provide a high-strength thick-walled electric resistance welded steel pipe having not only excellent low-temperature toughness but also excellent HIC resistance. The term "excellent low-temperature toughness", as used herein, means that both the base steel portion and the electric resistance welded portion have a circumferential absorbed energy $vE_{-50}$ of 150 J or more at a test temperature of −50° C. in a Charpy impact test in accordance with JIS Z 2242. The term "excellent HIC resistance", as used herein, means that both the base steel portion and the electric resistance welded portion have a crack area ratio CAR of 5% or less after immersion in a NACE Solution A (0.5% $CH_3COOH$+5% NaCl+saturated $H_2S$) specified in NACE TM0284.

SUMMARY

We thus provide:

(1) A high-strength thick-walled electric resistance welded steel pipe having excellent low-temperature toughness and excellent HIC resistance characterized by having; a chemical composition consisting of C: 0.025% to 0.084%, Si: 0.10% to 0.30%, Mn: 0.70% to 1.80%, P: 0.001% to 0.018%, S: 0.0001% to 0.0029%, Al: 0.01% to 0.10%, Nb: 0.001% to 0.065%, V: 0.001% to 0.065%, Ti: 0.001% to 0.033%, Ca: 0.0001% to 0.0035%, N: 0.0050% or less, O: 0.0030% or less on a mass percent basis, and the remainder being Fe and incidental impurities, wherein Pcm defined by the formula (1) is 0.20 or less, $$Pcm=C+Si/30+Mn/20+Cu/20+Ni/60+Cr/20+Mo/15+V/10+5B \quad (1)$$

wherein C, Si, Mn, Cu, Ni, Cr, Mo, V, and B denote the amounts (mass %) of the corresponding elements,
a microstructure which includes 90% by area or more of quasi-polygonal ferrite having a grain size of 10 μm or less in each of the base steel portion and the electric resistance welded portion of the steel pipe,
a yield strength YS of 400 MPa or more,
and
an absorbed energy $vE_{-50}$ of 150 J or more at −50° C. in a Charpy impact test.

(2) The high-strength thick-walled electric resistance welded steel pipe according to (1), characterized in that the chemical composition further contains B: 0.0030% or less on a mass percent basis.

(3) The high-strength thick-walled electric resistance welded steel pipe according to (1) or (2), characterized in that the chemical composition further contains at least one selected from Cu: 0.001% to 0.350%, Ni: 0.001% to 0.350%, Mo: 0.001% to 0.350%, and Cr: 0.001% to 0.700% on a mass percent basis.

(4) The high-strength thick-walled electric resistance welded steel pipe according to any one of (1) to (3), characterized in that the total amount of Si, Mn, Al, Ca, and Cr in inclusions having an equivalent circular diameter of 2 μm or more contained in the electric resistance welded portion is 0.0089% or less on a mass percent basis.

(5) A method of manufacturing a high-strength thick-walled electric resistance welded steel pipe having excellent low-temperature toughness and excellent HIC resistance, including a hot-rolling step of producing a hot-rolled steel strip from steel by heating, hot-rolling, cooling, and coiling, and a pipe-forming step of continuously roll-forming the hot-rolled steel strip after the hot-rolling step to form a tubular product having a substantially circular cross section and then butt-welding circumferential ends of the tubular product by electric resistance welding to produce an electric resistance welded steel pipe, characterized in that;
the steel has a chemical composition consisting of C: 0.025% to 0.084%, Si: 0.10% to 0.30%, Mn: 0.70% to 1.80%, P: 0.001% to 0.018%, S: 0.0001% to 0.0029%, Al: 0.01% to 0.10%, Nb: 0.001% to 0.065%, V: 0.001% to 0.065%, Ti: 0.001% to 0.033%, Ca: 0.0001% to 0.0035%, N: 0.0050% or less, O: 0.0030% or less on a mass percent basis, and the remainder being Fe and incidental impurities, wherein Pcm defined by the formula (1) is 0.20 or less, $$Pcm=C+Si/30+Mn/20+Cu/20+Ni/60+Cr/20+Mo/15+V/10+5B \qquad (1)$$

wherein C, Si, Mn, Cu, Ni, Cr, Mo, V, and B denote the amounts (mass %) of the corresponding elements,
the hot-rolling step is performed by heating the steel to a temperature in the range of 1200° C. to 1280° C., maintaining the temperature for 90 min or more, hot-rolling the steel at a hot-rolling reduction of 20% or more in an unrecrystallized austenite region, after the completion of the hot-rolling, cooling the steel to a finish cooling temperature of 630° C. or less at a cooling rate in the range of 7° C./s to 49° C./s, the cooling rate being the average cooling rate at a temperature from 780° C. to 630° C. at the central portion in the thickness direction, and coiling the steel at a coiling temperature of 400° C. or more and less than 600° C.,
the pipe-forming step is followed by a heat treatment that includes heating the electric resistance welded portion of the electric resistance welded steel pipe on a production line such that the electric resistance welded portion has a temperature in the range of 800° C. to 1150° C. over the total wall thickness, then cooling the electric resistance welded portion to a finish cooling temperature of 630° C. or less at a cooling rate in the range of 7° C./s to 49° C./s, the cooling rate being the average cooling rate at a temperature from 780° C. to 630° C. at the central portion in the thickness direction, and then allowing the electric resistance welded portion to air-cool,
and
the base steel portion and the electric resistance welded portion of the electric resistance welded steel pipe have a yield strength YS of 400 MPa or more and an absorbed energy $vE_{-50}$ of 150 J or more at −50° C. in a Charpy impact test.

(6) The method of manufacturing a high-strength thick-walled electric resistance welded steel pipe according to (5), characterized in that when a tapered groove is formed in the end faces of the hot-rolled steel strip in the width direction by fin pass forming during the roll-forming in the pipe-forming step, the distance between a taper starting position of the tapered groove and a surface that will become a pipe outer surface or a surface that will become a pipe inner surface in the steel strip thickness direction ranges from 2% to 60% of the hot-rolled steel strip thickness.

(7) The method of manufacturing a high-strength thick-walled electric resistance welded steel pipe according to (5) or (6), characterized in that the atmospheric oxygen partial pressure in the electric resistance welding in the pipe-forming step is adjusted at $900/f_{oxy}$ mass ppm or less, wherein the $f_{oxy}$ represents the degree of oxidizability of molten steel defined by the following formula (2), $$f_{oxy}=Mn+10(Si+Cr)+100Al+1000Ca \qquad (2)$$

wherein Mn, Si, Cr, Al, and Ca denote the amounts (mass %) of the corresponding elements.

(8) The method for manufacturing a high-strength thick-walled electric resistance welded steel pipe according to any one of (5) to (7), characterized in that the chemical composition of the steel further contains B: 0.0030% or less on a mass percent basis.

(9) The method of manufacturing a high-strength thick-walled electric resistance welded steel pipe according to any one of (5) to (8), characterized in that the chemical composition of the steel further contains at least one selected from Cu: 0.001% to 0.350%, Ni: 0.001% to 0.350%, Mo: 0.001% to 0.350%, and Cr: 0.001% to 0.700% on a mass percent basis.

(10) The method of manufacturing a high-strength thick-walled electric-resistance-welded steel pipe according to any one of (5) to (9), characterized in that the cooling in the heat treatment includes installing at least two lines of cooling headers in a conveying direction above the electric resistance welded portion, the cooling headers being coupled to a nozzle through which a rod-like flow of cooling water can be ejected at a water flow rate of 1 m³/m²·min or more, and ejecting the rod-like flow of cooling water through the nozzle at a rate of 1 m/s or more.

(11) The method of manufacturing a high-strength thick-walled electric resistance welded steel pipe according to (10), characterized in that the plurality of cooling headers are configured to independently control the ejection of cooling water.

A high-strength thick-walled electric resistance welded steel pipe that includes a base steel portion and an electric resistance welded portion having excellent low-temperature toughness and excellent HIC resistance can be easily and stably manufactured. Thus, our pipes and methods have an industrially advantageous effect. The high-strength thick-walled electric resistance welded steel pipe includes an electric resistance welded portion having excellent low-temperature toughness and excellent HIC resistance and therefore having improved reliability. Thus, the high-strength thick-walled electric resistance welded steel pipe can be stably used in applications that require excellent low-temperature toughness and excellent HIC resistance.

DETAILED DESCRIPTION

Figure 1:
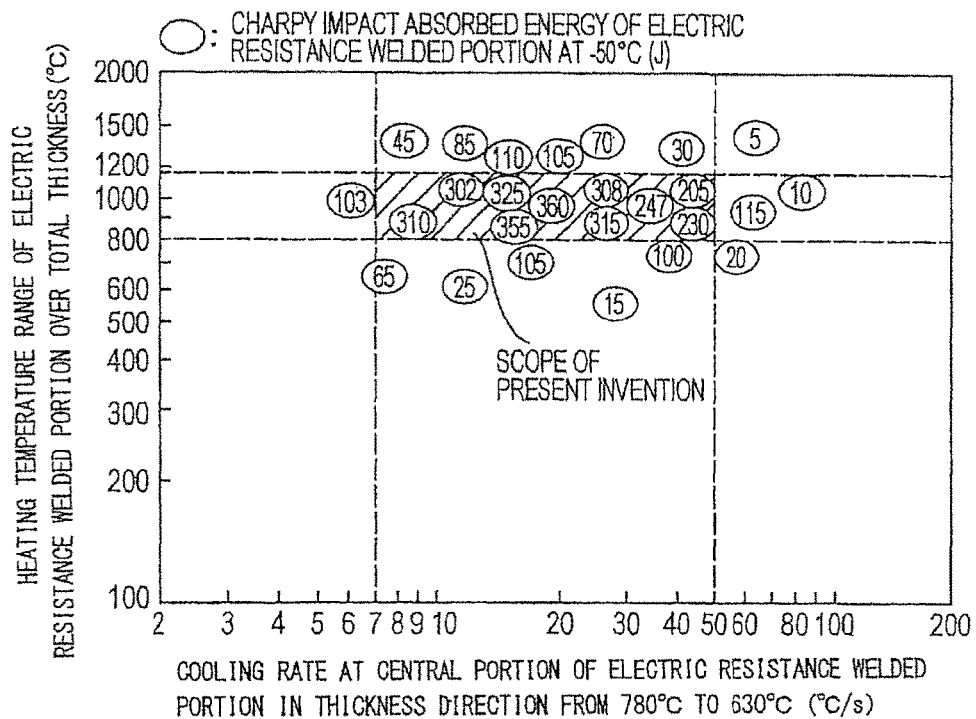
FIG. 1 is a graph of the $vE_{-50}$ of an electric resistance welded portion as a function of the heating temperature and the cooling rate after heating.

We systematically and extensively studied the effects of the microstructure and the oxides (inclusions) on the low-temperature toughness and the HIC resistance of the base steel portion and the electric resistance welded portion of a thick-walled electric resistance welded steel pipe having a thickness of more than 16 mm. We found that an electric resistance welded steel pipe having improved low-temperature toughness and HIC resistance both in the base steel portion and in the electric resistance welded portion, and thus giving particularly improved reliability can be manufactured by controlling the chemical composition of steel used and the hot-rolling conditions within particular ranges in conjunction with a heat treatment method after electric resistance welding.

First, the results of experiments on the improvement in the reliability of an electric resistance welded portion we performed will be described below.

A thick-walled electric resistance welded steel pipe (having an outer diameter of 660.4 mm) was prepared that had a chemical composition of 0.01% to 0.20% C, 0.01% to 1.00% Si, 0.50% to 3.00% Mn, 0.001% to 0.100% Al, 0% to 0.150% Nb, 0% to 0.150% V, 0% to 0.150% Ti, 0% to 0.0050% Ca, and 0.005% to 0.0100% N on a mass percent basis and had a thickness in the range of 16 to 32 mm.

The electric resistance welded portion of the electric resistance welded steel pipe was then subjected to a heat treatment (heat treatment after electric resistance welding) using an induction heating apparatus at different heating temperatures and under different cooling conditions after the heating. Test specimens were sampled from the electric resistance welded portion after the heat treatment and were subjected to an impact test, a HIC test, and a measurement of the amount of inclusions. These test and measurement methods are described below.

(1) Impact Test

V-notch Charpy impact test specimens (having a thickness of 10 mm) were sampled in the circumferential direction from the electric resistance welded portion in accordance with JIS Z 2242 such that the notch coincided with the central portion of the electric resistance-welded portion. The absorbed energy $vE_{-50}$ of each test specimen was measured in a Charpy impact test at a temperature of −50° C. The number of test specimens in measurement was three.

(2) HIC Test

Immersion test specimens (dimensions: 10 mm in thickness×20 mm in width×160 mm in length) were sampled from the electric resistance welded portion and were immersed in a NACE Solution A (0.5% $CH_3COOH$+5% NaCl+saturated $H_2S$) specified in NACE TM0284 for 96 hours. After the immersion, the crack area ratio CAR of each test specimen was determined using an ultrasonic flaw inspection method.

(3) Measurement of Amount of Inclusions

Sample sheets (dimensions: 2 mm in width×thickness: wall thickness×length:wall thickness) were cut from the center of the electric resistance welded portion and were subjected to electroextraction in a 10% AA electrolyte solution. After electroextraction, inclusions (having an equivalent circular diameter of 2 μm or more) were extracted with a filter mesh having an opening size of 2 μm and were subjected to alkali fusion. The Si, Mn, Al, Ca, and Cr contents were measured in an inductively coupled plasma (ICP) analysis. The total amount of Si, Mn, Al, Ca, and Cr was calculated. The total amount of Si, Mn, Al, Ca, and Cr in the inclusions having an equivalent circular diameter of 2 μm or more was considered to be the amount of inclusions in the electric resistance welded portion.

Figure 2:
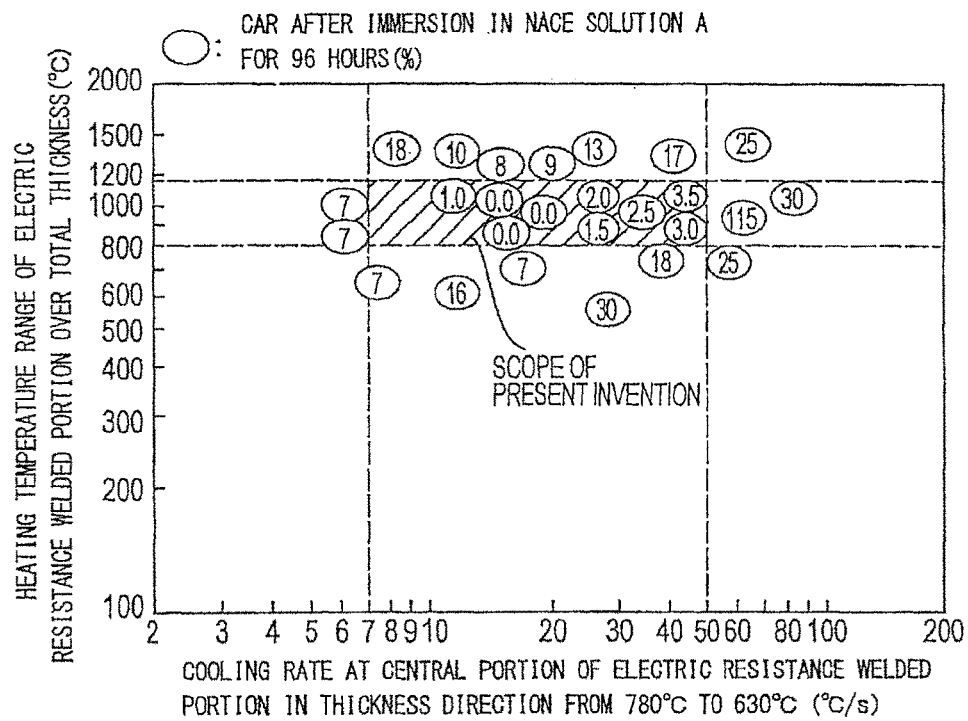
FIG. 2 is a graph of the crack area ratio CAR after the immersion of an electric resistance welded portion in a NACE Solution A as a function of the heating temperature and the cooling rate after heating.

The results are shown in FIGS. 1 and 2 as a function of the heating temperature and the cooling rate after the heating in the heat treatment. FIG. 1 shows the $vE_{-50}$, and FIG. 2 shows the CAR. The cooling rate after the heating was the average cooling rate at a temperature from 780° C. to 630° C. at the central portion in the thickness direction. FIGS. 1 and 2 show that when the heating temperature of the electric resistance welded portion ranges from 800° C. to 1150° C. and the cooling rate after the heating ranges from 7° C./s to 49° C./s on average between 780° C. and 630° C., the electric resistance welded portion has excellent low-temperature toughness of $vE_{-50}$=150 J or more and excellent HIC resistance of CAR=5% or less.

Thus, we found that an electric resistance welded portion subjected to the heat treatment under the conditions as described above after electric resistance welding had excellent low-temperature toughness and excellent HIC resistance.

Figure 3:
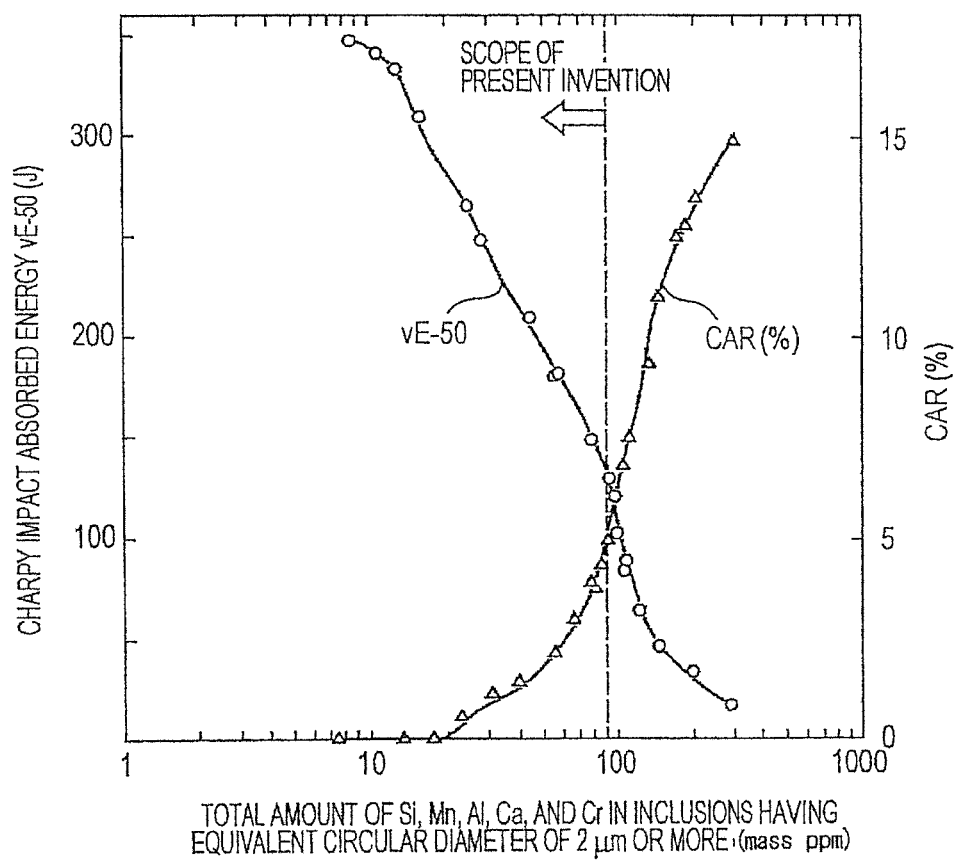
FIG. 3 is a graph of the $vE_{-50}$ of an electric resistance welded portion and the crack area ratio CAR after the immersion of the electric resistance welded portion in a NACE Solution A as a function of the total amount (mass ppm) of Si, Mn, Al, Ca, and Cr in inclusions having an equivalent circular diameter of 2 μm or more contained in the electric resistance welded portion.

On the basis of these results, FIG. 3 shows the relationship between $vE_{-50}$, CAR, and the total amount of Si, Mn, Al, Ca, and Cr in inclusions having an equivalent circular diameter of 2 μm or more.

FIG. 3 shows that when the total amount of Si, Mn, Al, Ca, and Cr in inclusions having an equivalent circular diameter of 2 μm or more is more than 89 mass ppm, the electric resistance welded portion has decreased $vE_{-50}$, increased CAR, that is, deteriorates low-temperature toughness and deteriorates HIC resistance.

Inclusions having an equivalent circular diameter of 2 μm or more in an electric resistance welded portion were paid attention as inclusions that had an influence on the characteristics of the electric resistance welded portion. We found that when the amount of inclusions having an equivalent circular diameter of 2 μm or more in the electric resistance welded portion exceeded a predetermined value, the electric resistance welded portion had significantly deteriorated low-temperature toughness and deteriorated HIC resistance. The present invention has been accomplished on the basis of these findings and is summarized as described below.

The high-strength thick-walled electric resistance welded steel pipe has a thick wall having a thickness in the range of 16 to 32 mm and includes a base steel portion and an electric resistance welded portion that have a yield strength YS of 400 MPa or more and excellent low-temperature toughness represented by a circumferential absorbed energy $vE_{-50}$ of 150 J or more at a test temperature of −50° C. in a Charpy impact test. The electric resistance welded steel pipe also has excellent HIC resistance represented by a crack area ratio CAR of 5% or less after the immersion of the electric resistance welded steel pipe in a NACE Solution A for 96 hours.

The reason for limiting the chemical composition of the electric resistance welded steel pipe will be described below. The mass % in the following chemical composition is simply referred to as %.

C: 0.025% to 0.084%

C forms hard phases such as pearlite, quasi-pearlite, cementite, bainite, or martensite, and increases the strength of a steel pipe. C has an influence on the formation of oxides in an electric resistance welded portion through solidifying point depression or CO-forming reaction with atmospheric $O_2$ during electric resistance welding. Such effects require a C content of 0.025% or more. The desired yield strength YS of 400 MPa or more cannot be achieved at a C content of less than 0.025%. A high C content of more than 0.084% results in a hard phase percentage of more than 10% in an electric resistance welded portion and a base steel portion, causing deterioration of low-temperature toughness, that is, an absorbed energy of less than 150 J at −50° C. in a Charpy impact test. This also results in a crack area ratio CAR of more than 5% after immersion in a NACE Solution A specified in NACE TM0284 for 96 hours, causing deterioration of HIC resistance. Thus, the C content is 0.025% to 0.084%, preferably 0.030% to 0.060%.

Si: 0.10% to 0.30%

Si increases the strength of an electric resistance welded steel pipe through solid solution strengthening. Si has higher affinity with O than Fe and can form eutectic oxides having a high viscosity with Mn oxides in an electric resistance welded portion. A Si content of less than 0.10% results in a high concentration of Mn in eutectic oxides and a melting point of the oxides higher than the molten steel temperature, thus often causing the oxides to remain in an electric resistance welded portion. This results in more than 89 mass ppm of Si, Mn, and Al in total in inclusions having a size of 2 μm or more contained in the electric resistance welded portion, causing deterioration of low-temperature toughness and deterioration of HIC resistance. Thus, the Si content is limited to 0.10% or more.

A Si content of more than 0.30% results in a high concentration of Si in eutectic oxides and a melting point of the oxides higher than the molten steel temperature, thus often causing the oxides to remain in an electric resistance welded portion. This results in more than 89 mass ppm of Si, Mn, and Al in total in inclusions having a size of 2 μm or more and an increased absolute amount of oxides, causing deterioration of low-temperature toughness and deterioration of HIC resistance. Thus, the Si content is limited to 0.30% or less. The Si content is preferably 0.15% to 0.25%.

Mn: 0.70% to 1.80%

Mn increases the strength of an electric resistance welded steel pipe through solid solution strengthening and transformation strengthening. Mn has higher affinity with O than Fe and can form eutectic oxides having a high viscosity with Si oxides in an electric resistance welded portion. A Mn content of less than 0.70% results in a high concentration of Si in eutectic oxides and a melting point of the oxides higher than the molten steel temperature, thus often causing the oxides to remain in an electric resistance welded portion. This results in more than 89 mass ppm of Si, Mn, and Al in total in inclusions having a size of 2 μm or more contained in the electric resistance welded portion, causing deterioration of low-temperature toughness and deterioration of HIC resistance. A Mn content of less than 0.70% results in a base steel portion and an electric resistance welded portion formed of coarse polygonal ferrite having a grain size dα of more than 10 μm, thus causing deterioration of low-temperature toughness. Thus, the Mn content is limited to 0.70% or more.

A high Mn content of more than 1.80% results in a high concentration of Mn in eutectic oxides and a melting point of the oxides higher than the molten steel temperature, thus often causing the oxides to remain in an electric resistance welded portion. This results in more than 89 mass ppm of Si, Mn, and Al in total in inclusions having an equivalent circular diameter of 2 μm or more contained in the electric resistance welded portion and an increased absolute amount of oxides. A Mn content of more than 1.80% results also in a hard phase percentage of more than 10% by area in a base steel portion and an electric resistance welded portion. This causes deterioration of low-temperature toughness and deterioration of HIC resistance. Thus, the Mn content is limited to 0.70% to 1.80%. The Mn content is preferably 0.85% to 1.65%.

P: 0.001% to 0.018%

P is an element that contributes to strengthening but deteriorates toughness because of segregation at grain boundaries or other regions. P cosegregates with Mn and deteriorates HIC resistance of a base steel portion and an electric resistance welded portion. Thus, it is desirable to minimize P content, but an extreme reduction in P content increases the refining cost. A P content of more than 0.018% results in remarkably deterioration of low-temperature toughness and deterioration of HIC resistance. Thus, the P content is limited to 0.001% to 0.018%, preferably 0.001% to 0.013%.

S: 0.0001% to 0.0029%

S precipitates as MnS in an electric resistance welded portion and a base steel portion and deteriorates low-temperature toughness and HIC resistance. Thus, it is desirable to minimize S content, but an excessive reduction in S content increases the refining cost. A S content of more than 0.0029% results in remarkably deterioration of low-temperature toughness and low HIC resistance. Thus, the S content is limited to 0.0001% to 0.0029%, preferably 0.0001% to 0.0019%.

Al: 0.01% to 0.10%

Al is an element that acts as a deoxidizing agent in a steel making process. Al precipitates as AlN in austenite, causes suppression of grain growth during heating of austenite, and improves low-temperature toughness. Al has higher affinity with O than Si or Mn and forms oxides as a solid solution in Mn—Si eutectic oxides such as $2MnO—SiO_2$ (Tephroite). Such an effect requires an Al content of 0.01% or more. An Al content of less than 0.01% results in insufficient deoxidation ability in a steel making process, low cleanliness of the steel, and more than 89 ppm of Si, Mn, and Al in total in inclusions having an equivalent circular diameter of 2 μm or more contained in an electric resistance welded portion. This causes deterioration of low-temperature toughness and deterioration of HIC resistance.

An Al content of more than 0.10% results in a high concentration of Al in eutectic oxides and a melting point of the oxides higher than the molten steel temperature, thus often causing the oxides to remain in an electric resistance welded portion. Thus, the total amount of Si, Mn, and Al in inclusions having an equivalent circular diameter of 2 μm or more contained in an electric resistance welded portion exceeds 89 ppm. This causes deterioration of low-temperature toughness and deterioration of HIC resistance. Thus, the Al content is limited to 0.01% to 0.10%, preferably 0.03% to 0.08%.

Nb: 0.001% to 0.065%

Nb precipitates mainly as carbides and increases the strength of an electric resistance welded steel pipe. Such an effect requires a Nb content of 0.001% or more. A high Nb content of more than 0.065% results in residual large undissolved Nb carbonitrides, causing deterioration of low-temperature toughness and deterioration of HIC resistance.

Thus, the Nb content is limited to 0.001% to 0.065%, preferably 0.005% to 0.050%.

V: 0.001% to 0.065%

Like Nb, V precipitates mainly as carbides and increases the strength of an electric resistance welded steel pipe. Such an effect requires a V content of 0.001% or more. A high V content of more than 0.065% results in residual large undissolved V carbonitrides, causing deterioration of low-temperature toughness and deterioration of HIC resistance. Thus, the V content is limited 0.001% to 0.065%, preferably 0.005% to 0.050%.

Ti: 0.001% to 0.033%

Like Nb and V, Ti precipitates mainly as carbides and increases the strength of an electric resistance welded steel pipe. Such an effect requires a Ti content of 0.001% or more. A high Ti content of more than 0.033% results in residual large undissolved Ti carbonitrides, causing deterioration of low-temperature toughness and deterioration of HIC resistance. Thus, the Ti content is limited to 0.001% to 0.033%, preferably 0.005% to 0.020%.

Ca: 0.0001% to 0.0035%

Ca is an element that makes sulfides in the steel spherical and improves low-temperature toughness and HIC resistance in the vicinity of an electric resistance welded portion. Such an effect requires a Ca content of 0.0001% or more. A Ca content of more than 0.0035% results in a high concentration of Ca in oxides because of high affinity of Ca with O. This results in a melting point of the oxides higher than the molten steel temperature, thus often causing the oxides to remain in an electric resistance welded portion. Thus, the total amount of Si, Mn, Al, Ca, and Cr in inclusions having an equivalent circular diameter of 2 µm or more contained in the electric resistance welded portion exceeds 89 mass ppm, and the absolute amount of oxide increases. This causes deterioration of low-temperature toughness and deterioration of HIC resistance. Thus, the Ca content is limited to 0.0001% to 0.0035%, preferably 0.0002% to 0.0028%.

N: 0.0050% or Less

N in an electric resistance welded portion and a base steel portion precipitates as Ti(N, C) or remains as solid solution and deteriorates low-temperature toughness and HIC resistance. It is therefore desirable to minimize N content, but an excessive reduction in N content increases the refining cost. Thus, it is desirable to limit the N content to 0.0001% or more. A N content of more than 0.0050% results in remarkably deterioration of low-temperature toughness and deterioration of HIC resistance. Thus, the N content is limited to 0.0050% or less, preferably 0.0001% to 0.0040%.

O: 0.0030% or Less

O in an electric resistance welded portion and a base steel portion remains as oxide inclusions and deteriorates low-temperature toughness and HIC resistance. Thus, it is desirable to minimize O content. An O content of more than 0.0030% results in remarkably deterioration of low-temperature toughness and deterioration of HIC resistance. Thus, the O content is limited to 0.0030% or less. However, an excessive reduction in O content increases the refining cost. Thus, the O content is preferably 0.0001% or more. The O content is preferably 0.0020% or less.

These elements are basic. In addition to these elements, B: 0.0030% or less and/or at least one selected from Cu: 0.001% to 0.350%, Ni: 0.001% to 0.350%, Mo: 0.001% to 0.350%, and Cr: 0.001% to 0.700% may be contained, if necessary.

B: 0.0030% or Less

B improves quench hardenability and thereby contributes to strengthening of an electric resistance welded steel pipe. The B content is preferably 0.0001% or more to obtain such an effect. However, such an effect levels off at a B content of more than 0.0030% and is not expected to be proportional to the B content beyond this threshold.

Thus, when an electric resistance welded steel pipe contains B, the B content is preferably limited to 0.0030% or less, more preferably 0.0020% or less.

At least one selected from Cu: 0.001% to 0.350%, Ni: 0.001% to 0.350%, Mo: 0.001% to 0.350%, and Cr: 0.001% to 0.700%

Cu, Ni, Mo, and Cr are elements that contribute to strengthening of a base steel portion and an electric resistance welded portion of a thick-walled electric resistance welded steel pipe and controlling of coarse polygonal ferrite. At least one of Cu, Ni, Mo, and Cr may be contained, if necessary.

Cu ensures the desired strengthening and suppresses the formation of coarse polygonal ferrite having a grain size $d_\alpha$ of more than 10 µm because of improved quench hardenability of a base steel portion and an electric resistance welded portion of a thick-walled electric resistance welded steel pipe. Cu also improves the HIC resistance of an electric resistance welded steel pipe. The Cu content is preferably 0.001% or more to obtain such effects. However, such effects level off at a Cu content of more than 0.350% and are not expected to be proportional to the Cu content beyond this threshold. Thus, when an electric resistance welded steel pipe contains Cu, the Cu content is preferably limited to 0.001% to 0.350%, more preferably 0.05% to 0.290%.

Like Cu, Ni ensures the desired strengthening and suppresses the formation of coarse polygonal ferrite having a grain size $d_\alpha$ of more than 10 µm because of improved quench hardenability of a base steel portion and an electric resistance welded portion of a thick-walled electric resistance welded steel pipe. Ni also improves the HIC resistance of an electric resistance welded steel pipe. The Ni content is preferably 0.001% or more to obtain such effects. Such effects level off at a Ni content of more than 0.350% and are not expected to be proportional to the Ni content beyond this threshold. Thus, when an electric resistance welded steel pipe contains Ni, the Ni content is preferably limited to 0.001% to 0.350%, more preferably 0.05% to 0.290%.

Like Ni and Cu, Mo ensures the desired strengthening and suppresses the formation of coarse polygonal ferrite having a grain size $d_\alpha$ of more than 10 µm because of improved quench hardenability of a base steel portion and an electric resistance welded portion of a thick-walled electric resistance welded steel pipe. Mo also improves the HIC resistance of an electric resistance welded steel pipe. The Mo content is preferably 0.001% or more to obtain such effects. Such effects level off at a Mo content of more than 0.350% and are not expected to be proportional to the Mo content beyond this threshold. Thus, when an electric resistance welded steel pipe contains Mo, the Mo content is preferably limited to 0.001% to 0.350%, more preferably 0.05% to 0.290%.

Like Mn, Cr contributes to strengthening of an electric resistance welded steel pipe through transformation strengthening, ensures the desired strengthening, and causes suppression of the formation of coarse polygonal ferrite. The Cr content is preferably 0.001% or more to obtain such effects. Cr has higher affinity with O than Fe and tends to form oxides. A Cr content of more than 0.700% results in a high concentration of Cr in oxides and a melting point of the oxides higher than the molten steel temperature, thus often causing the oxides to remain in an electric resistance welded portion. Thus, the absolute amount of oxides increases, and the total amount of Si, Mn, Al, and Cr in inclusions having an equivalent circular diameter of 2 μm or more contained in the electric resistance welded portion exceeds 89 mass ppm. This causes deterioration of low-temperature toughness and deterioration of HIC resistance. Thus, when an electric resistance welded steel pipe contains Cr, the Cr content is preferably limited to 0.001% to 0.700%, more preferably 0.01% to 0.700%, still more preferably 0.02% to 0.290%.

The amount of these elements are in the range described above, and Pcm defined by formula (1) satisfies 0.20 or less. Among these elements, the amount of element(s) not contained is zero.

$$Pcm=C+Si/30+Mn/20+Cu/20+Ni/60+Cr/20+Mo/15+V/10+5B \qquad (1)$$

wherein C, Si, Mn, Cu, Ni, Cr, Mo, V, and B denote the amounts (mass %) of the corresponding elements.

Pcm is a parameter related to microstructure formation after rapidly cooling an electric resistance welded portion. When Pcm is 0.20 or less, the microstructure of the electric resistance welded portion includes 90% by area or more of quasi-polygonal ferrite having a grain size of 10 μm or less. When Pcm is more than 0.20, the microstructure of the electric resistance welded portion includes less than 90% by area or more of quasi-polygonal ferrite. This causes deterioration of low-temperature toughness. The lower limit of Pcm is preferably, but is not limited to, 0.070 or more in order to stably ensure a yield strength YS of 400 MPa or more.

The reason for limiting the microstructure of the high-strength thick-walled electric resistance welded steel pipe will be described below. 90% by area or more of each of the base steel portion and the electric resistance welded portion of the high-strength thick-walled electric resistance welded steel pipe according to the present invention is occupied with quasi-polygonal ferrite having a grain size of 10 μm or less. The term "quasi-polygonal ferrite", as used herein, refers to "quasi-polygonal ferrite" ($\alpha q$) described in "Hagane no beinaito shashinsyu-1 (Photographs of bainite in steel-1)" (edited by Kiso kyodo kenkyu kai beinaito chosa kenkyu bukai (Basic joint research society, bainite research study group) of The Iron and Steel Institute of Japan: "Hagane no beinaito shashinsyu-1", p. 4, issued on Jun. 29, 1992, publisher: The Iron and Steel Institute of Japan). $\alpha q$ is non-regular shape ferrite formed at a lower temperature than polygonal ferrite $\alpha p$ across an austenite grain boundary before transformation. Transformation strain is mostly recovered in $\alpha q$.

When the area percentage of quasi-polygonal ferrite is less than 90%, the desired strengthening and low-temperature toughness cannot be achieved because of increased amount of coarse polygonal ferrite, or the desired high low-temperature toughness cannot be achieved because of excessive strengthening due to increased amount of bainite. Thus, the area percentage of quasi-polygonal ferrite is limited to 90% or more, preferably 92% or more. When the grain size $d_\alpha$ of quasi-polygonal ferrite is increased to more than 10 μm, the desired strengthening and low-temperature toughness cannot be achieved. Thus, the grain size $d_\alpha$ of quasi-polygonal ferrite is limited to 10 μm or less. The grain size is measured using an intercept method according to JIS G 0551 (2005).

A second phase other than quasi-polygonal ferrite may be pearlite, quasi-pearlite, cementite, bainite, and/or martensite, which occupies less than 10% by area in total.

In the electric resistance welded portion of the electric resistance welded steel pipe, the total amount of Si, Mn, Al, Ca, and Cr in inclusions having an equivalent circular diameter of 2 μm or more contained in the electric resistance welded portion is preferably 0.0089% or less. Among these elements, the amount of element(s) not contained is considered to be zero in the total amount. The total amount of Si, Mn, Al, Ca, and Cr in inclusions having an equivalent circular diameter of 2 μm or more means the amount of inclusions that have an influence on the characteristics. The amount of inclusions increases with the total amount.

Among the inclusions (oxides) in an electric resistance welded portion, when the total amount of Si, Mn, Al, Ca, and Cr in inclusions having an equivalent circular diameter of 2 μm or more is less than 89 mass ppm, the crack area ratio (CAR) after immersion in a NACE Solution A (0.5% $CH_3COOH$+5% NaCl+saturated $H_2S$) specified in NACE TM0284 is 5% or less, which indicates improved HIC resistance. Furthermore, the Charpy impact absorbed energy $vE_{-50}$ of the electric resistance welded portion at a test temperature of −50° C. is more than 150 J, which indicates excellent low-temperature toughness. When the total amount of Si, Mn, Al, Ca, and Cr in the inclusions having an equivalent circular diameter of 2 μm or more is more than 89 ppm, this results in deterioration of HIC resistance and deterioration of low-temperature toughness. Thus, the total amount of Si, Mn, Al, Ca, and Cr in the inclusions having an equivalent circular diameter of 2 μm or more is preferably limited to 89 mass ppm or less, more preferably 39 mass ppm or less.

Among the inclusions contained in an electric resistance welded portion, the total amount of Si, Mn, Al, Ca, and Cr in inclusions having an equivalent circular diameter of 2 μm or more is determined as described below.

Sample sheets (dimensions: 2 mm in width×thickness: wall thickness×length:wall thickness) were cut from the center of the electric resistance welded portion of the electric resistance welded steel pipe and were subjected to electro-extraction in a 10% AA electrolyte solution. After the electroextraction, inclusions having a size of 2 μm or more were extracted with a filter mesh having an opening size of 2 μm and are subjected to alkali fusion. The Si, Mn, Al, Ca, and Cr contents were measured in an ICP analysis. The total amount of the elements was calculated and considered to be the total amount of Si, Mn, Al, Ca, and Cr in the inclusions having an equivalent circular diameter of 2 μm or more.

The reason for limiting the method of manufacturing an electric resistance welded steel pipe will be described below.

A steel such as a slab having the chemical composition as described above is formed into a hot-rolled steel strip in a hot-rolling step. The hot-rolled steel strip is continuously roll-formed to form a tubular product. The tubular product is subjected to electric resistance welding in a pipe-forming step to produce an electric resistance welded steel pipe. The steel may be manufactured using any method. Preferably, a molten steel having the chemical composition as described above is produced using an ordinary melting method, for example, using a converter and is formed into a steel, such as a slab, using an ordinary casting method such as a continuous casting method.

The steel such as a slab is formed into a hot-rolled steel strip in the hot-rolling step.

In the hot-rolling step, the steel having the chemical composition as described above is heated to a temperature of 1200° C. to 1280° C., is held at the temperature for 90 min or more, and subjected to hot-rolling at a hot-rolling reduction rate (reduction rate) of 20% or more in an unrecrystallized austenite region (unrecrystallization temperature range). After the completion of the hot-rolling, the steel is cooled to a finish cooling temperature of 630° C. or less at a cooling rate of 7° C./s to 49° C./s. The cooling rate is the average cooling rate at a temperature from 780° C. to 630° C. at the central portion in the thickness direction. After cooling, the steel is coiled at a coiling temperature of 400° C. or more and less than 600° C. (400° C. to 599° C.) to form a hot-rolled steel strip.

Heating Temperature: 1200° C. to 1280° C.

The steel heating temperature has an influence on the strength, low-temperature toughness, and HIC resistance of a base steel portion of a steel pipe. At a heating temperature of less than 1200° C., precipitation strengthening elements such as Nb, V, and Ti, are not redissolved and remain as coarse precipitates. Thus, the desired high yield strength YS of 400 MPa or more cannot be achieved. The residual coarse precipitates reduce HIC resistance. A high heating temperature of more than 1280° C. results in coarsening of crystal grains and coarsening of the resulting quasi-polygonal ferrite. Thus, the desired grain size $d_\alpha$ of 10 µm or less cannot be satisfied. Coarsening of the microstructure deteriorates low-temperature toughness. Thus, the heating temperature is limited to 1200° C. to 1280° C. The heating holding time is 90 min or more. A heating holding time of less than 90 min results in residual coarse precipitates of undissolved precipitation strengthening elements such as Nb, V, and Ti, at the central portion in the thickness direction, which deteriorate HIC resistance. Thus, the heating holding time is limited to 90 min or more.

The heated steel is subjected to hot-rolling, which includes rough rolling and finish rolling. In the finish rolling, the hot-rolling reduction rate (reduction rate) in an unrecrystallized austenite region (unrecrystallization temperature range) is 20% or more, and the finishing temperature is 780° C. or more.

Hot-Rolling Reduction Rate (Reduction Rate) in an Unrecrystallized Austenite Region (Unrecrystallization Temperature Range): 20% or More When the hot-rolling reduction rate (reduction rate) in an unrecrystallized austenite region (unrecrystallization temperature range) is less than 20%, the microstructure is coarsened, and the desired low-temperature toughness cannot be achieved. Thus, the hot-rolling reduction rate (reduction rate) in an unrecrystallized austenite region (unrecrystallization temperature range) is limited to 20% or more, preferably 30% or more.

Finishing Temperature: 780° C. or More

The finishing temperature of the finish rolling is preferably 780° C. or more. A finishing temperature of less than 780° C. results in residual rolling strain and deterioration of low-temperature toughness of the hot-rolled steel sheet.

After completion of the hot-rolling, the hot-rolled steel sheet is cooled on a hot-rolling runout table. The steel sheet is cooled to a finish cooling temperature of 630° C. or less at a cooling rate of 7° C./s to 49° C./s. The cooling rate is the average rate at a temperature from 780° C. to 630° C. at the central portion in the thickness direction. The steel sheet is then coiled at a coiling temperature of 400° C. or more and less than 600° C. (400° C. to 599° C.).

Average Cooling Rate from 780° C. to 630° C.: 7° C./s to 49° C./s

When the average cooling rate is less than 7° C./s, coarse polygonal ferrite is formed, and the desired high low-temperature toughness and high strength cannot be achieved. When the average cooling rate is more than 49° C./s, bainite or martensite is formed, and the desired high low-temperature toughness cannot be achieved because of excessively high strength. Thus, the cooling rate from 780° C. to 630° C. ranges from 7° C./s to 49° C./s on average. Preferably, the average cooling rate is 29° C./s or less such that the amount of quasi-polygonal ferrite is 92% or more.

In the cooling after the hot-rolling, it is desirable that except for an uppermost surface layer having a thickness of 0.2 mm, a deviation from the cooling rate at the central portion in the thickness direction is within 5° C./s at the slowest position and within 20° C./s at the fastest position.

The steel sheet is cooled to a temperature of 630° C. or less at the central portion in the thickness direction at such a cooling rate and is then coiled.

Finish Cooling Temperature: 630° C. or Less

When the finish cooling temperature is more than 630° C., the desired fine microstructure cannot be formed, and the desired high strength and high low-temperature toughness cannot be achieved in the base steel portion. Thus, the finish cooling temperature is limited to 630° C. or less, preferably 600° C. to 550° C.

Coiling Temperature: 400° C. or More and Less than 600° C. (400° C. to 599° C.)

When the coiling temperature is 600° C. or more, the microstructure is coarsened and cannot have the desired grain size and the desired area percentage of quasi-polygonal ferrite. When the coiling temperature is less than 400° C., the steel sheet contains a large amount of bainite and has increased strength, deteriorated low-temperature toughness and deteriorated HIC resistance. Thus, the coiling temperature is limited to 400° C. or more and less than 600° C. (400° C. to 599° C.), preferably 550° C. to 450° C.

In the hot-rolled steel strip resulting from the hot-rolling, the cooling, and the coiling, the area percentage of fine quasi-polygonal ferrite having a grain size $d_\alpha$ of 10 µm or less is 90% or more, the remainder being pearlite, quasi-pearlite, cementite, bainite, and/or martensite. The hot-rolled steel strip is used as a base steel to manufacture a steel pipe that includes a base steel portion having high strength represented by a yield strength YS of 400 MPa or more, excellent low-temperature toughness represented by a Charpy impact absorbed energy $vE_{-50}$ of 150 J or more at a test temperature of −50° C., and excellent HIC resistance represented by a crack area ratio CAR of 5% or less after immersion in a NACE Solution A specified in NACE TM0284 for 96 hours.

The hot-rolled steel strip is then cut in a predetermined width and subjected to a pipe-forming step to form an electric resistance welded steel pipe having a predetermined size.

The pipe-forming step may be any generally known process of manufacturing an electric resistance welded pipe under any conditions, provided that the electric resistance welded steel pipe has a predetermined size.

Preferably, an electric resistance welded steel pipe is formed by continuously roll-forming a hot-rolled steel strip to form a tubular product having a substantially circular cross section, butting the circumferential ends of the tubular product, heating the circumferential ends to at least the melting point by high-frequency resistance heating or high-frequency induction heating, pressing the circumferential ends with squeeze rolls, and welding the seam by electric resistance welding.

In the roll-forming, a tapered groove is preferably formed by fin pass forming in the end faces of a hot-rolled steel strip in the width direction. The tapered groove can promote removal of oxides from the electric resistance welded portion and thereby impart excellent low-temperature toughness and excellent HIC resistance to the electric resistance welded portion. The distance in the steel strip thickness direction between a taper starting position of the tapered groove at the ends in the width direction and a surface that will become a pipe outer surface or a surface that will become a pipe inner surface preferably ranges from 2% to 60% of the thickness of the steel strip. This can promote removal of oxides and reduce the total amount of Si, Mn, Al, Ca, and Cr in inclusions having an equivalent circular diameter of 2 µm or more contained in the electric resistance welded portion by approximately 10 mass ppm. A taper outside this range makes it difficult to remove oxides and results in an electric resistance welded portion having deterioration of low-temperature toughness. The shape of the taper is not limited to a straight line and may be a curved line.

The atmosphere in the electric resistance welding in the pipe-forming step is preferably controlled such that the atmospheric oxygen partial pressure is $900/f_{oxy}$ mass ppm or less, wherein the $f_{oxy}$ denotes the degree of oxidizability of molten steel defined by formula (2), $$f_{oxy}=Mn+10(Si+Cr)+100Al+1000Ca \qquad (2)$$

wherein Mn, Si, Cr, Al, and Ca denote the amounts (mass %) of the corresponding elements.

Lowering the atmospheric oxygen partial pressure in the electric resistance welding can reduce the amount of coarse oxides in the electric resistance welded portion. When the atmospheric oxygen partial pressure in the electric-resistance-welded portion is $900/f_{oxy}$ mass ppm or less, the total amount of Si, Mn, Al, Ca, and Cr in inclusions having an equivalent circular diameter of 2 µm or more can be reduced by approximately 20 mass ppm.

The atmospheric oxygen partial pressure in the electric resistance welded portion may be reduced by sealing the electric resistance welded portion in a box structure and supplying a nonoxidizing gas to the electric resistance welded portion. In this method, however, the supply of the nonoxidizing gas may accompany the ambient atmosphere, and the atmospheric oxygen partial pressure in the electric resistance welded portion may be increased. To avoid this, the nonoxidizing gas is preferably supplied as a laminar flow through a nozzle having a multilayer structure, such as a three-layer structure. The concentration of oxygen in the electric resistance welded portion is preferably measured by bringing a probe of an oxygen meter close to the electric resistance welded portion.

The electric resistance welded portion of the electric resistance welded steel pipe after the pipe-forming step is subjected to heat treatment.

The low-temperature toughness of the electric resistance welded portion depends on the amount of oxides in the electric resistance welded portion and on the microstructure. Therefore, the electric resistance welded portion is further subjected to heat treatment on a production line. In the heat treatment, the electric resistance welded portion is heated to a temperature of 800° C. to 1150° C. over the total thickness and then cooled to a finish cooling temperature of 630° C. or less at a cooling rate of 7° C./s to 49° C./s. The cooling rate is the average cooling rate at a temperature from 780° C. to 630° C. at the central portion in the thickness direction. The electric resistance welded portion is then air-cooled. The heating of the electric resistance welded portion is preferably mainly performed with an induction heating apparatus on a production line in terms of productivity.

Heating Temperature of Heat Treatment: 800° C. to 1150° C.

When the heating temperature is less than 800° C., the microstructure of the electric resistance welded portion is composed of coarse polygonal ferrite, and it is difficult to ensure the desired high strength and high low-temperature toughness. A high heating temperature of more than 1150° C. results in the formation of coarse quasi-polygonal ferrite having a grain size $d_\alpha$ of more than 10 µm, causing deterioration of low-temperature toughness. Thus, the heating temperature of the heat treatment is limited to 800° C. to 1150° C., preferably 850° C. to 1100° C.

Average Cooling Rate after Heating in Heat Treatment: 7° C./s to 49° C./s

When the average cooling rate from 780° C. to 630° C. after heating is less than 7° C./s, the microstructure is composed of coarse polygonal ferrite, and it is difficult to ensure the desired high strength and high low-temperature toughness. When the average cooling rate is more than 49° C./s, this promotes the formation of bainite and reduces the area percentage of quasi-polygonal ferrite to less than 90%, thus resulting in increased strength, deteriorated low-temperature toughness and deteriorated HIC resistance. Thus, the average cooling rate after heating is limited to 7° C./s to 49° C./s from 780° C. to 630° C. Preferably, the average cooling rate is 29° C./s or less such that the percentage of quasi-polygonal ferrite is 93% or more.

In the cooling after heating of the electric resistance welded portion, it is desirable that except for an uppermost surface layer having a thickness of 0.2 mm, a deviation from the cooling rate at the central portion in the thickness direction is within 5° C./s at the slowest position and within 20° C./s at the fastest position. This reduces variations in characteristics in the thickness direction.

Finish Cooling Temperature: 630° C. or Less

In the cooling after heating, when the finish cooling temperature is more than 630° C., the desired fine microstructure cannot be formed, and the desired high strength and high low-temperature toughness cannot be achieved in the electric resistance welded portion. Thus, the finish cooling temperature is limited to 630° C. or less, preferably 550° C. to 200° C.

In the electric resistance welded portion subjected to such heat treatment, the area percentage of fine quasi-polygonal ferrite having a grain size $d_\alpha$ of 10 µm or less is 90% or more, and the remainder are pearlite, quasi-pearlite, cementite, bainite, and/or martensite. The resulting electric resistance welded steel pipe includes an electric resistance welded portion having high strength represented by a yield strength YS of 400 MPa or more, excellent low-temperature toughness represented by a Charpy impact absorbed energy $vE_{-50}$ of 150 J or more at a test temperature of −50° C., and excellent HIC resistance represented by a crack area ratio CAR of 5% or less after immersion in a NACE Solution A specified in NACE TM0284 for 96 hours.

To control the cooling after heating in the heat treatment of an electric resistance welded portion of a thick-walled electric resistance welded steel pipe having a thickness of more than 16 mm and ensure an electric resistance welded portion having the desired microstructure, it is necessary to examine the flow rate of ejected cooling water and determine the cooling method and the temperature controlling method.

In heat treatment, at least two lines of cooling headers are arranged in a conveying direction above the electric resistance welded portion. The cooling headers are coupled to a nozzle through which a rod-like flow of cooling water can be ejected at a water flow rate of 1 m³/m²·min or more. The rod-like flow of cooling water is preferably ejected from the nozzle at a rate of 1 m/s or more. The at least two lines of cooling headers are preferably configured to independently control the ejection of cooling water. The cooling rate at the electric resistance welded portion is adjusted to the target cooling rate by measuring the temperature of the electric resistance welded portion on the downstream side in the conveying direction and performing the on-off control of the ejection of cooling water from each of the cooling headers in response to the temperature of the electric resistance welded portion. This can improve temperature control, allows the electric resistance welded portion to be stably cooled to 630° C. or less at a cooling rate of 7° C./s to 49° C./s as desired, the cooling rate being the average cooling rate at a temperature from 780° C. to 630° C. at the central portion in the thickness direction, and allows the desired microstructure to be stably formed.

When the water flow rate is less than 1 m$^3$/m$^2$·min, or less than two lines of nozzles are arranged in the conveying direction of the steel pipe, or the ejection rate of cooling water is less than 1 m/s, the desired cooling rate cannot be achieved because of a boiling film, for example. In addition to the water flow rate to ensure the cooling rate by rapidly removing the boiling film, it is effective to incline the nozzles or install opposed nozzles.

EXAMPLES

Example 1

A steel slab (steel) (thickness: 250 mm) having a chemical composition shown in Table 1 was subjected to a hot-rolling step including heating, finish rolling, cooling after the finish rolling, and coiling under the conditions shown in Table 2 to produce a hot-rolled steel strip having a thickness shown in Table 2. The hot-rolled steel strip was cut in a predetermined width by slitting and continuously roll-formed in an ordinary pipe-forming step to form a tubular product having a substantially circular cross section. An electric resistance welded steel pipe (having an outer diameter of 26 inches (660.4 mm)) was formed in a pipe-forming step that included butting the circumferential ends of the tubular product, heating the circumferential ends to at least the melting point by high-frequency resistance heating, pressing the circumferential ends with squeeze rolls, and performing electric resistance welding. No tapered groove was formed in the ends of the steel strip in the roll-forming. The electric resistance welding was performed in air.

After the pipe-forming step, the electric resistance welded portion was subjected to heat treatment.

In the heat treatment, the electric resistance welded portion was subjected to heating and cooling on the production line under the conditions shown in Table 2. A high-frequency induction heating apparatus on the production line was used in the heating. The cooling after the heating was performed with ten lines of cooling headers that were disposed above the electric resistance welded portion in the conveying direction of the steel pipe and coupled to a nozzle through which a rod-like flow of cooling water could be ejected at a water flow rate of 2 m$^3$/m$^2$·min. The cooling headers could independently perform the on-off control of the ejection of cooling water. A rod-like flow of cooling water could be ejected through the nozzle at a rate of 2 m/s. The cooling rate at the electric resistance welded portion was controlled by measuring the temperature of the electric resistance welded portion on the downstream side in the steel pipe conveying direction and performing the on-off control of the ejection of cooling water from each of the cooling headers in response to the temperature of the electric resistance welded portion.

Test specimens were sampled from the base steel portion and the electric resistance welded portion of the electric resistance welded steel pipe and subjected to a tensile test, an impact test, a HIC test, and a measurement of the amount of inclusions. The test methods were described below.

(A) Tensile Test

JIS 12C test specimens according to JIS Z 2241 were sampled from the base steel portion of the electric resistance welded steel pipe. The tensile direction for the base steel portion was the axial direction of the pipe. JIS 1A test specimens according to JIS Z 2241 were sampled from the electric resistance welded portion of the steel pipe such that the tensile direction was the circumferential direction. The tensile properties (the yield strength YS and the tensile strength TS) were measured in the tensile test.

(B) Impact Test

V-notch Charpy impact test specimens (having a thickness of 10 mm) were sampled in the circumferential direction from the base steel portion and the electric resistance welded portion of the electric resistance welded steel pipe in accordance with JIS Z 2242 such that the notch in the electric resistance welded portion coincided with the central portion of the electric resistance welded portion. The absorbed energy vE$_{-50}$ of each test specimen was measured in a Charpy impact test at a temperature of −50° C. The number of test specimens in measurement was three.

(C) HIC Test

Immersion test specimens (dimensions: 10 mm in thickness×20 mm in width×160 mm in length) were sampled from the base steel portion and the electric resistance welded portion of the electric resistance welded steel pipe and were immersed in a NACE Solution A (0.5% CH$_3$COOH+5% NaCl+saturated H$_2$S) specified in NACE TM0284 for 96 hours. After the immersion, the crack area ratio CAR of each test specimen was determined using an ultrasonic flaw inspection method.

(D) Measurement of Amount of Inclusions

Sample sheets (dimensions: 2 mm in width×thickness: wall thickness×length:wall thickness) were cut from the center of the electric resistance welded portion of the electric resistance welded steel pipe and were subjected to electroextraction in a 10% AA electrolyte solution. After the electroextraction, inclusions having a size of 2 μm or more were extracted with a filter mesh having an opening size of 2 μm and were subjected to alkali fusion. The Si, Mn, Al, Ca, and Cr contents were measured in an ICP analysis. The total amount of Si, Mn, Al, Ca, and Cr was calculated. The total amount of Si, Mn, Al, Ca, and Cr in the inclusions having an equivalent circular diameter of 2 μm or more was considered to be the amount of coarse inclusions in the electric resistance welded portion. Table 3 shows the results.

TABLE 1

| Steel No. | C | Si | Mn | P | S | Al | Nb | V | Ti | Ca | N | O | Others | Pcm | Note |
|---|---|---|---|---|---|---|---|---|---|---|---|---|---|---|---|
| A | 0.037 | 0.16 | 0.87 | 0.005 | 0.0004 | 0.036 | 0.045 | 0.045 | 0.01 | 0.002 | 0.0035 | 0.0009 | - | 0.09 | Example |
| B | 0.045 | 0.17 | 1.01 | 0.004 | 0.0006 | 0.03 | 0.052 | 0.052 | 0.012 | 0.0019 | 0.0027 | 0.0012 | Cu: 0.19, Ni: 0.16, Mo: 0.19 | 0.13 | Example |
| C | 0.046 | 0.21 | 1.4 | 0.012 | 0.0005 | 0.032 | 0.056 | 0.062 | 0.015 | 0.0025 | 0.0036 | 0.0011 | Cu: 0.19, Ni: 0.15 | 0.14 | Example |
| D | 0.052 | 0.21 | 1.62 | 0.012 | 0.0018 | 0.035 | 0.062 | 0.023 | 0.014 | 0.0018 | 0.0033 | 0.0014 | Cu: 0.28, Ni: 0.21, Mo: 0.14 | 0.17 | Example |
| E | 0.027 | 0.15 | 1.53 | 0.01 | 0.0015 | 0.041 | 0.047 | 0.035 | 0.011 | 0.0025 | 0.0039 | 0.0009 | B: 0.0007 | 0.12 | Example |
| F | 0.061 | 0.22 | 1.78 | 0.01 | 0.0016 | 0.037 | 0.058 | 0.024 | 0.016 | 0.0021 | 0.0037 | 0.0011 | Cr: 0.003 | 0.16 | Example |
| G | 0.024 | 0.27 | 1.44 | 0.014 | 0.0012 | 0.063 | 0.023 | 0.032 | 0.021 | 0.0002 | 0.0014 | 0.0018 | - | 0.11 | Comparative example |
| H | 0.085 | 0.16 | 1.74 | 0.011 | 0.0008 | 0.026 | 0.014 | 0.012 | 0.016 | 0.0004 | 0.0031 | 0.0012 | - | 0.18 | Comparative example |
| I | 0.055 | 0.05 | 1.52 | 0.016 | 0.0021 | 0.074 | 0.054 | 0.042 | 0.008 | 0.0007 | 0.003 | 0.0012 | - | 0.14 | Comparative example |
| J | 0.042 | 0.36 | 1.58 | 0.005 | 0.0015 | 0.038 | 0.052 | 0.054 | 0.018 | 0.0018 | 0.0038 | 0.0044 | - | 0.14 | Comparative example |
| K | 0.037 | 0.19 | 0.64 | 0.017 | 0.002 | 0.049 | 0.061 | 0.055 | 0.012 | 0.0021 | 0.0018 | 0.0007 | - | 0.08 | Comparative example |
| L | 0.036 | 0.23 | 1.95 | 0.012 | 0.0008 | 0.021 | 0.025 | 0.014 | 0.017 | 0.0019 | 0.0033 | 0.0015 | - | 0.14 | Comparative example |
| M | 0.042 | 0.27 | 1.23 | 0.021 | 0.0022 | 0.038 | 0.045 | 0.064 | 0.016 | 0.0026 | 0.0008 | 0.0015 | - | 0.12 | Comparative example |
| N | 0.055 | 0.21 | 1.05 | 0.014 | 0.0032 | 0.035 | 0.003 | 0.015 | 0.014 | 0.0024 | 0.0026 | 0.0016 | - | 0.12 | Comparative example |
| O | 0.071 | 0.19 | 1.28 | 0.018 | 0.0021 | 0.003 | 0.024 | 0.025 | 0.01 | 0.0011 | 0.0032 | 0.0011 | - | 0.14 | Comparative example |
| P | 0.028 | 0.2 | 1.44 | 0.012 | 0.0025 | 0.123 | 0.024 | 0.043 | 0.008 | 0.0009 | 0.0039 | 0.0022 | - | 0.11 | Comparative example |
| Q | 0.036 | 0.2 | 1.36 | 0.006 | 0.0021 | 0.046 | - | 0.042 | 0.002 | 0.0016 | 0.0042 | 0.0021 | - | 0.11 | Comparative example |
| R | 0.061 | 0.24 | 1.48 | 0.011 | 0.0008 | 0.051 | 0.075 | 0.042 | 0.016 | 0.0032 | 0.0036 | 0.0025 | - | 0.15 | Comparative example |
| S | 0.051 | 0.19 | 1.25 | 0.01 | 0.0004 | 0.026 | 0.014 | - | 0.022 | 0.0022 | 0.0039 | 0.0008 | - | 0.12 | Comparative example |
| T | 0.071 | 0.21 | 0.87 | 0.012 | 0.0006 | 0.031 | 0.014 | 0.072 | 0.028 | 0.0034 | 0.0025 | 0.0016 | - | 0.13 | Comparative example |
| U | 0.061 | 0.23 | 0.97 | 0.008 | 0.0007 | 0.041 | 0.054 | 0.012 | - | 0.0015 | 0.0014 | 0.0016 | - | 0.12 | Comparative example |
| V | 0.064 | 0.2 | 0.95 | 0.009 | 0.0005 | 0.045 | 0.064 | 0.002 | 0.039 | 0.0008 | 0.0026 | 0.0018 | - | 0.12 | Comparative example |
| W | 0.043 | 0.22 | 1.35 | 0.018 | 0.0009 | 0.024 | 0.047 | 0.005 | 0.023 | - | 0.0019 | 0.0006 | - | 0.12 | Comparative example |
| X | 0.029 | 0.2 | 1.53 | 0.009 | 0.0021 | 0.042 | 0.042 | 0.018 | 0.031 | 0.0039 | 0.0039 | 0.0024 | - | 0.11 | Comparative example |
| Y | 0.034 | 0.18 | 1.35 | 0.004 | 0.0018 | 0.064 | 0.056 | 0.045 | 0.024 | 0.0021 | 0.0056 | 0.0016 | - | 0.11 | Comparative example |
| Z | 0.036 | 0.19 | 1.2 | 0.008 | 0.001 | 0.042 | 0.052 | 0.022 | 0.011 | 0.0048 | 0.0025 | 0.0034 | - | 0.1 | Comparative example |
| AA | 0.072 | 0.23 | 1.75 | 0.008 | 0.0005 | 0.044 | 0.062 | 0.059 | 0.016 | 0.0015 | 0.0047 | 0.0023 | Cu: 0.25, Ni: 0.25, Mo: 0.25, Cr: 0.15 | 0.21 | Comparative example |

Underline refers to outside of the scope of the present invention.

TABLE 2

| | | Hot-rolling step | | | | | | | |
|---|---|---|---|---|---|---|---|---|---|
| Steel pipe No. | Steel No. | Heating temperature (° C.) | Heating holding time (min) | Rolling reduction rate (%)* | Finishing temperature (° C.) | Average cooling rate after rolling** (° C./s) | Finish cooling temperature*** (° C.) | Coiling temperature (° C.) | Steel strip thickness mm |
| 1 | A | 1240 | 100 | 50 | 820 | 15 | 520 | 495 | 24 |
| 2 | B | 1240 | 100 | 50 | 820 | 15 | 520 | 495 | 24 |
| 3 | C | 1240 | 100 | 50 | 820 | 15 | 520 | 495 | 24 |
| 4 | D | 1240 | 100 | 50 | 820 | 15 | 520 | 495 | 24 |
| 5 | E | 1240 | 100 | 50 | 820 | 15 | 520 | 495 | 24 |
| 6 | F | 1240 | 100 | 50 | 820 | 15 | 520 | 495 | 24 |
| 7 | G | 1240 | 100 | 50 | 820 | 15 | 520 | 495 | 24 |
| 8 | H | 1240 | 100 | 50 | 820 | 15 | 520 | 495 | 24 |
| 9 | I | 1240 | 100 | 50 | 820 | 15 | 520 | 495 | 24 |
| 10 | J | 1240 | 100 | 50 | 820 | 15 | 520 | 495 | 24 |
| 11 | K | 1240 | 100 | 50 | 820 | 15 | 520 | 495 | 24 |
| 12 | L | 1240 | 100 | 50 | 820 | 15 | 520 | 495 | 24 |

TABLE 2-continued

| | | | | | | | | | |
|---|---|---|---|---|---|---|---|---|---|
| 13 | M | 1240 | 100 | 50 | 820 | 15 | 520 | 495 | 24 |
| 14 | N | 1240 | 100 | 50 | 820 | 15 | 520 | 495 | 24 |
| 15 | O | 1240 | 100 | 50 | 820 | 15 | 520 | 495 | 24 |
| 16 | P | 1240 | 100 | 50 | 820 | 15 | 520 | 495 | 24 |
| 17 | Q | 1240 | 100 | 50 | 820 | 15 | 520 | 495 | 24 |
| 18 | R | 1240 | 100 | 50 | 820 | 15 | 520 | 495 | 24 |
| 19 | S | 1240 | 100 | 50 | 820 | 15 | 520 | 495 | 24 |
| 20 | T | 1240 | 100 | 50 | 820 | 15 | 520 | 495 | 24 |
| 21 | U | 1240 | 100 | 50 | 820 | 15 | 520 | 495 | 24 |
| 22 | V | 1240 | 100 | 50 | 820 | 15 | 520 | 495 | 24 |
| 23 | W | 1240 | 100 | 50 | 820 | 15 | 520 | 495 | 24 |
| 24 | X | 1240 | 100 | 50 | 820 | 15 | 520 | 495 | 24 |
| 25 | Y | 1240 | 100 | 50 | 820 | 15 | 520 | 495 | 24 |
| 26 | Z | 1240 | 100 | 50 | 820 | 15 | 520 | 495 | 24 |
| 27 | AA | 1240 | 100 | 50 | 820 | 15 | 520 | 495 | 24 |

| | | Pipe-forming step | | | | | | Heat treatment | | |
|---|---|---|---|---|---|---|---|---|---|---|
| | | Electric resistance welding | | | | Steel pipe dimensions | | Heating temperature range of electric | Average cooling rate after | Finish cooling |
| Steel pipe No. | Roll-forming Formation of groove**** | Atmospheric oxygen concentration (ppm) | f oxy | 900/ f oxy | Nonoxidizing gas blowing | Wall thickness (mm) | Outer diameter (mmφ) | resistance welded portion (° C.) | heating (° C./s) | temperature (° C.) |
| 1 | — | Air | 8.1 | 112 | — | 24 | 660.4 | 1050 | 20 | 300 |
| 2 | — | Air | 7.6 | 118 | — | 24 | 660.4 | 1050 | 20 | 300 |
| 3 | — | Air | 9.2 | 98 | — | 24 | 660.4 | 1050 | 20 | 300 |
| 4 | — | Air | 9 | 100 | — | 24 | 660.4 | 1050 | 20 | 300 |
| 5 | — | Air | 9.6 | 93 | — | 24 | 660.4 | 1050 | 20 | 300 |
| 6 | — | Air | 9.8 | 92 | — | 24 | 660.4 | 1050 | 20 | 300 |
| 7 | — | Air | 10.6 | 85 | — | 24 | 660.4 | 1050 | 20 | 300 |
| 8 | — | Air | 6.3 | 142 | — | 24 | 660.4 | 1050 | 20 | 300 |
| 9 | — | Air | 10.1 | 89 | — | 24 | 660.4 | 1050 | 20 | 300 |
| 10 | — | Air | 10.6 | 85 | — | 24 | 660.4 | 1050 | 20 | 300 |
| 11 | — | Air | 9.5 | 94 | — | 24 | 660.4 | 1050 | 20 | 300 |
| 12 | — | Air | 8.3 | 109 | — | 24 | 660.4 | 1050 | 20 | 300 |
| 13 | — | Air | 10.3 | 87 | — | 24 | 660.4 | 1050 | 20 | 300 |
| 14 | — | Air | 9.1 | 99 | — | 24 | 660.4 | 1050 | 20 | 300 |
| 15 | — | Air | 4.6 | 197 | — | 24 | 660.4 | 1050 | 20 | 300 |
| 16 | — | Air | 16.6 | 54 | — | 24 | 660.4 | 1050 | 20 | 300 |
| 17 | — | Air | 9.6 | 94 | — | 24 | 660.4 | 1050 | 20 | 300 |
| 18 | — | Air | 12.2 | 74 | — | 24 | 660.4 | 1050 | 20 | 300 |
| 19 | — | Air | 8 | 113 | — | 24 | 660.4 | 1050 | 20 | 300 |
| 20 | — | Air | 9.5 | 95 | — | 24 | 660.4 | 1050 | 20 | 300 |
| 21 | — | Air | 8.9 | 101 | — | 24 | 660.4 | 1050 | 20 | 300 |
| 22 | — | Air | 8.3 | 109 | — | 24 | 660.4 | 1050 | 20 | 300 |
| 23 | — | Air | 6 | 151 | — | 24 | 660.4 | 1050 | 20 | 300 |
| 24 | — | Air | 11.6 | 77 | — | 24 | 660.4 | 1050 | 20 | 300 |
| 25 | — | Air | 11.7 | 77 | — | 24 | 660.4 | 1050 | 20 | 300 |
| 26 | — | Air | 11.9 | 76 | — | 24 | 660.4 | 1050 | 20 | 300 |
| 27 | — | Air | 10 | 90 | — | 24 | 660.4 | 1050 | 20 | 300 |

Underline refers to the outside of the scope of the present invention.
*Unrecrystallization temperature range
**Average cooling rate at the central portion temperatures in the thickness direction from 780° C. to 630° C.
***Central portion temperature in the thickness direction
****Distance between the taper starting position and the top surface/Total thickness × 100%

TABLE 3

| | | Base steel portion | | | | | | | Electric resistance welded portion | | |
|---|---|---|---|---|---|---|---|---|---|---|---|
| | | | | | Tensile properties | | | HIC | Structure | | |
| Steel pipe No. | Steel No. | Structure | | | Yield strength YS (MPa) | Tensile strength TS (MPa) | Toughness vE$_{-50}$ (J) | resistance CAR (%) | | QPF | QPF Grain size (μm) |
| | | Type* | Percentage (% by area) | Grain size (μm) | | | | | Type* | Percentage (% by area) | |
| 1 | A | QPF + B + C | QPF: 96 | 6.8 | 489 | 532 | 360 | 0 | QPF + B + C | QPF: 95 | 8.5 |
| 2 | B | QPF + B + C | QPF: 94 | 5.9 | 496 | 540 | 380 | 0 | QPF + B + C | QPF: 93 | 6.8 |
| 3 | C | QPF + B + C | QPF: 94 | 5.7 | 497 | 538 | 370 | 0 | QPF + B + C | QPF: 94 | 6.5 |
| 4 | D | QPF + B + C | QPF: 93 | 3.6 | 603 | 652 | 312 | 3.8 | QPF + B + C | QPF: 93 | 4.2 |
| 5 | E | QPF + B + C | QPF: 93 | 2.6 | 725 | 790 | 280 | 4.5 | QPF + B + C | QPF: 93 | 3.5 |

TABLE 3-continued

| | | | | | | | | | | | |
|---|---|---|---|---|---|---|---|---|---|---|---|
| 6 | F | QPF + B + C | QPF: 93 | 3.1 | 610 | 662 | 292 | 4.7 | QPF + B + C | QPF: 93 | 4.4 |
| 7 | G | PF + P | PF: 95 | 11.5 | 390 | 405 | 340 | 1.2 | PF + P | PF: 96 | 12.3 |
| 8 | H | QPF + B + C | QPF: 76 | 4.5 | 659 | 717 | 135 | 5.9 | QPF + B + C | QPF: 76 | 4.9 |
| 9 | I | QPF + B + C | QPF: 86 | 5.2 | 479 | 510 | 165 | 4.7 | QPF + B + C | QPF: 87 | 5.4 |
| 10 | J | QPF + B + C | QPF: 91 | 4.6 | 512 | 560 | 170 | 4.9 | QPF + B + C | QPF: 93 | 4.9 |
| 11 | K | PF + P | PF: 94 | 12.7 | 365 | 388 | 337 | 4.8 | PF + P | PF: 95 | 13.2 |
| 12 | L | B + M | B: 78 | 3.8 | 669 | 716 | 125 | 7.8 | B + M | B: 77 | 4.2 |
| 13 | M | QPF + B + C | QPF: 90 | 4.4 | 489 | 531 | 168 | 5.5 | QPF + B + C | QPF: 90 | 4.7 |
| 14 | N | QPF + B + C | QPF: 93 | 4.1 | 467 | 509 | 134 | 11.4 | QPF + B + C | QPF: 93 | 4.5 |
| 15 | O | QPF + B + C | QPF: 91 | 5.4 | 501 | 544 | 143 | 6.8 | QPF + B + C | QPF: 92 | 5.2 |
| 16 | P | QPF + B + C | QPF: 92 | 4.1 | 436 | 476 | 125 | 6.9 | QPF + B + C | QPF: 93 | 4.2 |
| 17 | Q | PF + P | PF: 96 | 10.5 | 370 | 408 | 310 | 4.3 | PF + P | PF: 96 | 11 |
| 18 | R | QPF + B + C | QPF: 86 | 3.7 | 518 | 564 | 135 | 6.9 | QPF + B + C | QPF: 86 | 4.3 |
| 19 | S | PF + P | PF: 95 | 10.2 | 380 | 418 | 343 | 0 | PF + P | PF: 95 | 10.4 |
| 20 | T | QPF + B + C | QPF: 88 | 5.2 | 520 | 562 | 144 | 6.5 | QPF + B + C | QPF: 88 | 5.8 |
| 21 | U | PF + P | PF: 93 | 12 | 390 | 450 | 280 | 0 | PF + P | PF: 92 | 12.7 |
| 22 | V | QPF + B + C | QPF: 93 | 4.7 | 516 | 560 | 110 | 6.9 | QPF + B + C | QPF: 93 | 5.4 |
| 23 | W | QPF + B + C | QPF: 96 | 5.3 | 490 | 533 | 148 | 5.4 | QPF + B + C | QPF: 96 | 5.8 |
| 24 | X | QPF + B + C | QPF: 95 | 4.3 | 469 | 519 | 105 | 8.9 | QPF + B + C | QPF: 97 | 4.4 |
| 25 | Y | QPF + B + C | QPF: 92 | 4.6 | 490 | 546 | 102 | 5.4 | QPF + B + C | QPF: 92 | 5 |
| 26 | Z | QPF + B + C | QPF: 93 | 4.4 | 497 | 546 | 97 | 9.9 | QPF + B + C | QPF: 93 | 4.3 |
| 27 | AA | B + M | B: 75 | 3.5 | 658 | 728 | 130 | 5.7 | QPF + B + C | QPF: 75 | 4.1 |

| | Electric resistance welded portion | | | | | |
|---|---|---|---|---|---|---|
| | Tensile properties | | Total alloy amount in inclusions | | HIC | |
| Steel pipe No. | Yield strength YS (MPa) | Tensile strength TS (MPa) | having a size of 2 μm or more (ppm)** | Toughness vE$_{-50}$ (J) | resistance CAR (%) | Note |
| 1 | 486 | 552 | 29 | 370 | 0 | Example |
| 2 | 490 | 555 | 24 | 385 | 0 | Example |
| 3 | 500 | 570 | 26 | 378 | 0 | Example |
| 4 | 593 | 680 | 32 | 315 | 2.6 | Example |
| 5 | 715 | 810 | 35 | 282 | 3.6 | Example |
| 6 | 603 | 687 | 39 | 300 | 3.5 | Example |
| 7 | 367 | 417 | 66 | 326 | 1.2 | Comparative example |
| 8 | 623 | 708 | 42 | 128 | 6.5 | Comparative example |
| 9 | 444 | 505 | 96 | 104 | 6.2 | Comparative example |
| 10 | 480 | 545 | 128 | 69 | 8.7 | Comparative example |
| 11 | 342 | 390 | 83 | 168 | 3.4 | Comparative example |
| 12 | 629 | 715 | 82 | 119 | 7.6 | Comparative example |
| 13 | 456 | 518 | 74 | 106 | 6.5 | Comparative example |
| 14 | 444 | 505 | 72 | 76 | 23.9 | Comparative example |
| 15 | 480 | 545 | 96 | 102 | 7.8 | Comparative example |
| 16 | 410 | 466 | 108 | 76 | 10.4 | Comparative example |
| 17 | 450 | 524 | 68 | 289 | 3.2 | Comparative example |
| 18 | 480 | 545 | 68 | 116 | 7 | Comparative example |
| 19 | 360 | 432 | 64 | 324 | 1.2 | Comparative example |
| 20 | 490 | 557 | 66 | 121 | 6 | Comparative example |
| 21 | 371 | 431 | 66 | 245 | 1.1 | Comparative example |
| 22 | 487 | 553 | 78 | 78 | 8.9 | Comparative example |
| 23 | 482 | 525 | 75 | 116 | 7.9 | Comparative example |
| 24 | 450 | 511 | 107 | 86 | 9.8 | Comparative example |
| 25 | 462 | 525 | 82 | 108 | 5.2 | Comparative example |
| 26 | 469 | 533 | 106 | 68 | 10.4 | Comparative example |
| 27 | 618 | 702 | 64 | 121 | 5.9 | Comparative example |

Underline refers to the outside of the scope of the present invention.
*QPF: quasi-polygonal ferrite, PF: polygonal ferrite, B: bainite, P: perlite, QP: quasi-perlite, C: cementite, M: martensite
**Total amount of Si, Mn, Al, Ca, and Cr in inclusions having an equivalent circular diameter of 2 μm or more (mass ppm)

The base steel portion and the electric resistance welded portion of the electric resistance welded steel pipe according to our examples have a microstructure in which fine quasi-polygonal ferrite having a grain size $d_\alpha$ of 10 μm or less occupies 90% by area or more. The base steel portion and the electric resistance welded portion have high strength represented by a yield strength YS of 400 MPa or more, excellent low-temperature toughness represented by a Charpy impact absorbed energy vE$_{-50}$ of 150 J or more at −50° C., and excellent HIC resistance represented by a crack area ratio CAR of 5% or less after immersion in a NACE Solution A specified in NACE TM0284 for 96 hours. The remainder other than quasi-polygonal ferrite were pearlite, quasi-pearlite, cementite, bainite, and martensite, which occupies less than 10% by area in total.

In the comparative examples, the base steel portion and the electric resistance welded portion do not have a microstructure mainly composed of fine quasi-polygonal ferrite, or the total amount of Si, Mn, Al, Ca, and Cr in the inclusions having an equivalent circular diameter of 2 μm or more contained in the electric resistance welded portion increases to more than 89 mass ppm. Thus, the comparative examples do not have the desired high strength or have deterioration of low-temperature toughness or deterioration of HIC resistance.

In the comparative examples in which any of C, Mn, Nb, V, and Ti is lower than our range (steel pipes Nos. 7, 11, 17, 19, and 21), the base steel portion and the electric resistance welded portion have a softer polygonal ferrite microstructure and a low yield strength YS of less than 400 MPa. In the comparative examples in which any of C, Mn, Nb, V, and Ti is higher than our range (steel pipes Nos. 8, 12, 18, 20, and 22), the base steel portion and the electric resistance welded portion have deterioration of low-temperature toughness and deterioration of HIC resistance. In the comparative examples in which any of Si, Al, Ca, and O is outside our range (steel pipes Nos. 9, 10, 15, 16, 24, and 26), the total amount of Si, Mn, Al, Ca, and Cr in the inclusions having an equivalent circular diameter of 2 μm or more contained in the electric resistance welded portion is more than 89 mass ppm, and the electric resistance welded portion has deterioration of low-temperature toughness and deterioration of HIC resistance. The comparative examples in which any of P, S, Ca, N, and Pcm is outside our range (steel pipes Nos. 13, 14, 23, 24, 25, and 27) have deteriorated low-temperature toughness and deteriorated HIC resistance.

Example 2

Steels (slabs) of steel Nos. A to F shown in Table 1 were used in a hot-rolling step under the conditions shown in Table 4 to produce hot-rolled steel strips having a thickness shown in Table 4. The hot-rolled steel strips were cut in a predetermined width by slitting, were continuously roll-formed, and subjected to electric resistance welding in a pipe-forming step to form electric resistance welded steel pipes having the dimensions shown in Table 4. In the roll-forming of some of the steel pipes, a tapered groove having the dimensions shown in Table 4 was formed in the ends of the steel strip in the width direction. The electric resistance welding was performed in the air except for some steel pipes. In some of the steel pipes, a nonoxidizing gas was blown into the atmosphere of the electric resistance welding. In this case, gas blowing nozzles were arranged in three layers, and the oxygen partial pressure reduced to 45 mass ppm.

The electric resistance welded portions of the electric resistance welded steel pipes were subjected to heat treatment including heating and cooling under the conditions shown in Table 4. An induction heating apparatus on the production line was used in the heating. In the cooling, ten lines of cooling headers were disposed above the electric resistance welded portion in the conveying direction and coupled to a nozzle through which a rod-like flow of cooling water could be ejected at a water flow rate of 2 $m^3/m^2 \cdot min$. A rod-like flow of cooling water was ejected through the nozzle at a rate of 2 m/s or more. The cooling headers were configured to independently control the ejection of cooling water. The cooling rate at the electric resistance welded portion was controlled by measuring the temperature of the electric resistance welded portion on the downstream side in the conveying direction and performing the on-off control of the ejection of cooling water from each of the cooling headers in response to the temperature of the electric resistance welded portion.

In the same manner as in Example 1, test specimens were sampled from the electric resistance welded steel pipe and subjected to a tensile test, an impact test, a HIC test, and a measurement of the amount of inclusions. The test methods were described in Example 1. Table 5 shows the results.

TABLE 4

| | | Hot-rolling step | | | | | | | Pipe-forming step | |
|---|---|---|---|---|---|---|---|---|---|---|
| Steel pipe No. | Steel No. | Heating temperature (° C.) | Heating holding time (min) | Rolling reduction rate (%)* | Finishing temperature (° C.) | Average cooling rate after rolling** (° C./s) | Finish cooling temperature*** (° C.) | Coiling temperature (° C.) | Steel strip thickness mm | Roll-forming Formation of groove**** | Electric resistance welding Atmospheric oxygen concentration (ppm) |
| A1 | A | 1240 | 120 | 45 | 820 | 17 | 590 | 570 | 25.4 | — | Air |
| A2 | A | 1290 | 120 | 45 | 820 | 17 | 590 | 570 | 25.4 | — | Air |
| A3 | A | 1180 | 120 | 45 | 820 | 17 | 590 | 570 | 25.4 | — | Air |
| A4 | A | 1240 | 70 | 45 | 820 | 17 | 590 | 570 | 25.4 | — | Air |
| A5 | A | 1240 | 120 | 15 | 820 | 17 | 590 | 570 | 25.4 | — | Air |
| A6 | B | 1250 | 100 | 60 | 820 | 27 | 510 | 490 | 16 | — | Air |
| A7 | B | 1250 | 100 | 60 | 820 | 27 | 510 | 490 | 16 | — | Air |
| A8 | B | 1250 | 100 | 60 | 820 | 27 | 510 | 490 | 16 | — | Air |
| A9 | B | 1250 | 100 | 60 | 820 | 27 | 510 | 490 | 16 | — | Air |
| A10 | B | 1250 | 100 | 60 | 820 | 27 | 510 | 490 | 16 | — | Air |
| A11 | C | 1220 | 110 | 25 | 820 | 26 | 570 | 550 | 32 | — | Air |
| A12 | C | 1220 | 110 | 25 | 820 | 26 | 570 | 550 | 32 | — | Air |
| A13 | C | 1220 | 110 | 25 | 820 | 26 | 570 | 550 | 32 | — | Air |
| A14 | C | 1220 | 110 | 25 | 820 | 26 | 570 | 550 | 32 | Outer surface: 10% + inner surface 10% | Air |
| A15 | C | 1220 | 110 | 25 | 820 | 26 | 570 | 550 | 32 | — | Air |
| A16 | D | 1270 | 105 | 50 | 820 | 6 | 500 | 480 | 22.5 | — | Air |
| A17 | D | 1270 | 105 | 50 | 820 | 13 | 500 | 480 | 22.5 | — | Air |
| A18 | D | 1270 | 105 | 50 | 820 | 26 | 500 | 480 | 22.5 | — | Air |
| A19 | D | 1270 | 105 | 50 | 820 | 45 | 500 | 480 | 22.5 | — | Air |
| A20 | D | 1270 | 105 | 50 | 820 | 63 | 500 | 480 | 22.5 | — | Air |
| A21 | E | 1240 | 95 | 40 | 820 | 13 | 615 | 595 | 25.4 | — | Air |
| A22 | E | 1240 | 95 | 40 | 820 | 13 | 615 | 595 | 25.4 | — | Air |
| A23 | E | 1240 | 95 | 40 | 820 | 13 | 615 | 595 | 25.4 | — | Air |
| A24 | E | 1240 | 95 | 40 | 820 | 13 | 615 | 595 | 25.4 | — | 45 |

TABLE 4-continued

| | | | | | | | | | | |
|---|---|---|---|---|---|---|---|---|---|---|
| A25 | E | 1240 | 95 | 40 | 820 | 13 | 615 | 595 | 25.4 | — | Air |
| A26 | F | 1250 | 110 | 60 | 820 | 19 | 560 | 540 | 20.6 | — | Air |
| A27 | F | 1250 | 110 | 60 | 820 | 19 | 560 | 540 | 20.6 | — | Air |
| A28 | F | 1250 | 110 | 60 | 820 | 19 | 560 | 540 | 20.6 | — | Air |
| A29 | F | 1250 | 110 | 60 | 820 | 19 | 560 | 540 | 20.6 | — | Air |
| A30 | F | 1250 | 110 | 60 | 820 | 19 | 560 | 540 | 20.6 | — | Air |

| Steel pipe No. | Pipe-forming step Electric resistance welding | | | Steel pipe dimensions | | Heat treatment | | | Note |
|---|---|---|---|---|---|---|---|---|---|
| | f oxy | 900/ f oxy | Nonoxidizing gas blowing | Wall thickness (mm) | Outer diameter (mmφ) | Heating temperature range of electric resistance welded portion (° C.) | Average cooling rate after heating (° C./s) | Finish cooling temperature (° C.) | |
| A1 | 8.1 | 112 | — | 25.4 | 660.4 | 910~1060 | 19 | 300 | Example |
| A2 | 8.1 | 112 | — | 25.4 | 660.4 | 910~1060 | 19 | 300 | Comparative example |
| A3 | 8.1 | 112 | — | 25.4 | 660.4 | 910~1060 | 19 | 300 | Comparative example |
| A4 | 8.1 | 112 | — | 25.4 | 660.4 | 910~1060 | 19 | 300 | Comparative example |
| A5 | 8.1 | 112 | — | 25.4 | 660.4 | 910~1060 | 19 | 300 | Comparative example |
| A6 | 7.6 | 118 | — | 16 | 660.4 | 920~1080 | <u>6</u> | 300 | Comparative example |
| A7 | 7.6 | 118 | — | 16 | 660.4 | 920~1080 | 14 | 300 | Example |
| A8 | 7.6 | 118 | — | 16 | 660.4 | 920~1080 | 25 | 300 | Example |
| A9 | 7.6 | 118 | — | 16 | 660.4 | 920~1080 | 46 | 300 | Example |
| A10 | 7.6 | 118 | — | 16 | 660.4 | 920~1080 | <u>56</u> | 300 | Comparative example |
| A11 | 9.2 | 98 | — | 32 | 508 | <u>760</u>~1050 | 28 | 300 | Comparative example |
| A12 | 9.2 | 98 | — | 32 | 508 | 810~1080 | 28 | 300 | Example |
| A13 | 9.2 | 98 | — | 32 | 508 | 900~1120 | 28 | 300 | Example |
| A14 | 9.2 | 98 | — | 32 | 508 | 900~1120 | 28 | 300 | Example |
| A15 | 9.2 | 98 | — | 32 | 508 | 950~<u>1160</u> | 28 | 300 | Comparative example |
| A16 | 9 | 100 | — | 22.5 | 609.6 | 890~1030 | 17 | 300 | Comparative example |
| A17 | 9 | 100 | — | 22.5 | 609.6 | 890~1030 | 17 | 300 | Example |
| A18 | 9 | 100 | — | 22.5 | 609.6 | 890~1030 | 17 | 300 | Example |
| A19 | 9 | 100 | — | 22.5 | 609.6 | 890~1030 | 17 | 300 | Example |
| A20 | 9 | 100 | — | 22.5 | 609.6 | 890~1030 | 17 | 300 | Comparative example |
| A21 | 9.6 | 93 | — | 25.4 | 457.2 | <u>780</u>~1060 | 12 | 300 | Comparative example |
| A22 | 9.6 | 93 | — | 25.4 | 457.2 | 820~1070 | 12 | 300 | Example |
| A23 | 9.6 | 93 | — | 25.4 | 457.2 | 910~1110 | 12 | 300 | Example |
| A24 | 9.6 | 93 | Three-layer nozzle | 25.4 | 457.2 | 910~1110 | 12 | 300 | Example |
| A25 | 9.6 | 93 | — | 25.4 | 457.2 | 950~<u>1160</u> | 12 | 300 | Comparative example |
| A26 | 9.8 | 92 | — | 20.6 | 660.4 | 900~1090 | <u>6</u> | 300 | Comparative example |
| A27 | 9.8 | 92 | — | 20.6 | 660.4 | 900~1090 | 27 | 300 | Example |
| A28 | 9.8 | 92 | — | 20.6 | 660.4 | 900~1090 | 27 | 300***** | Example |
| A29 | 9.8 | 92 | — | 20.6 | 660.4 | 900~1090 | 35 | 300 | Example |
| A30 | 9.8 | 92 | — | 20.6 | 660.4 | 900~1090 | <u>53</u> | 300 | Comparative example |

<u>Underline</u> refers to the outside of the scope of the present invention.
*Unrecrystallization temperature range
**Average cooling rate at the central portion temperatures in the thickness direction from 780° C. to 630° C.
***Central portion temperature in the thickness direction
****Distance between the taper starting position and the top surface/Total thickness × 100%
*****Tempering (450° C. × 1 min)

TABLE 5

| Steel pipe No. | Steel No. | Base steel portion Structure Type* | Base Structure Percentage (% by area) | Base Grain size (μm) | Base Tensile Yield strength YS (MPa) | Base Tensile Tensile strength TS (MPa) | Base Toughness vE$_{-50}$ (J) | Base HIC resistance CAR (%) | ERW Structure Type* | ERW Structure Percentage (% by area) | ERW Grain size (μm) | ERW Tensile Yield strength YS (MPa) | ERW Tensile Tensile strength TS (MPa) | Total amount in inclusions (ppm)** | Toughness vE$_{-50}$ (J) | HIC resistance CAR (%) | Note |
|---|---|---|---|---|---|---|---|---|---|---|---|---|---|---|---|---|---|
| A1 | A | QPF + B + C | QPF: 95 | 6.6 | 490 | 533 | 370 | 0 | QPF + B + C | QPF: 95 | 8.3 | 486 | 552 | 30 | 369 | 0 | Example |
| A2 | A | QPF + B + C | QPF: 93 | 10.8 | 483 | 538 | 130 | 2.6 | QPF + B + C | QPF: 94 | 9.6 | 476 | 534 | 47 | 287 | 2.4 | Comparative example |
| A3 | A | QPF + B + C | QPF: 93 | 7.8 | 387 | 437 | 270 | 5.6 | QPF + B + C | QPF: 94 | 9.2 | 389 | 438 | 57 | 356 | 5.6 | Comparative example |
| A4 | A | QPF + B + C | QPF: 93 | 6.8 | 427 | 489 | 287 | 5.9 | QPF + B + C | QPF: 93 | 8.8 | 429 | 489 | 44 | 246 | 5.6 | Comparative example |
| A5 | A | QPF + B + C | QPF: 92 | 12.4 | 436 | 492 | 127 | 2.5 | QPF + B + C | QPF: 92 | 9.8 | 435 | 479 | 43 | 190 | 2.4 | Comparative example |
| A6 | B | QPF + B + C | QPF: 94 | 5.4 | 501 | 550 | 375 | 0 | PF + P | PF: 93 | 12.4 | 387 | 440 | 43 | 147 | 1.5 | Comparative example |
| A7 | B | QPF + B + C | QPF: 94 | 5.4 | 501 | 550 | 375 | 0 | QPF + B + C | QPF: 94 | 7.8 | 488 | 555 | 28 | 379 | 0 | Example |
| A8 | B | QPF + B + C | QPF: 94 | 5.4 | 501 | 550 | 375 | 0 | QPF + B + C | QPF: 93 | 6.6 | 498 | 566 | 26 | 387 | 0 | Example |
| A9 | B | QPF + B + C | QPF: 94 | 5.4 | 501 | 550 | 375 | 0 | QPF + B + C | QPF: 93 | 6.3 | 512 | 582 | 38 | 256 | 1.1 | Example |
| A10 | B | QPF + B + C | B: 78 | 5.4 | 501 | 550 | 375 | 0 | B + M | B: 88 | 5.9 | 578 | 657 | 44 | 123 | 6.3 | Comparative example |
| A11 | C | QPF + B + C | QPF: 93 | 5.4 | 489 | 533 | 368 | 0 | PF + P | PF: 94 | 10.4 | 393 | 442 | 45 | 143 | 1.7 | Comparative example |
| A12 | C | QPF + B + C | QPF: 93 | 5.4 | 489 | 533 | 368 | 0 | QPF + B + C | QPF: 94 | 5.9 | 498 | 560 | 34 | 366 | 0 | Example |
| A13 | C | QPF + B + C | QPF: 93 | 5.4 | 489 | 533 | 368 | 0 | QPF + B + C | QPF: 93 | 6.4 | 505 | 576 | 29 | 375 | 0 | Example |
| A14 | C | QPF + B + C | QPF: 93 | 5.4 | 489 | 533 | 368 | 0 | QPF + B + C | QPF: 93 | 6.3 | 506 | 569 | 19 | 412 | 0 | Example |
| A15 | C | QPF + B + C | QPF: 93 | 5.4 | 489 | 533 | 368 | 0 | QPF + B + C | QPF: 87 | 12.3 | 561 | 630 | 45 | 87 | 6.5 | Comparative example |
| A16 | D | PF + P | PF: 93 | 10.8 | 395 | 489 | 125 | 6.3 | QPF + B + C | PF: 94 | 5.4 | 547 | 615 | 45 | 245 | 4.7 | Comparative example |
| A17 | D | QPF + B + C | QPF: 93 | 5.2 | 589 | 640 | 304 | 3.6 | QPF + B + C | QPF: 93 | 4.9 | 565 | 635 | 36 | 314 | 3.2 | Example |
| A18 | D | QPF + B + C | QPF: 93 | 3.7 | 610 | 663 | 310 | 3.5 | QPF + B + C | QPF: 93 | 4.7 | 595 | 682 | 34 | 308 | 2.9 | Example |
| A19 | D | QPF + B + C | QPF: 91 | 3.5 | 623 | 677 | 245 | 4.8 | QPF + B + C | QPF: 93 | 4.5 | 594 | 667 | 34 | 285 | 4.2 | Example |
| A20 | D | B + M | B: 78 | 3.2 | 656 | 725 | 135 | 5.9 | QPF + B + C | QPF: 91 | 4.2 | 605 | 680 | 42 | 178 | 4.8 | Comparative example |
| A21 | E | QPF + B + C | QPF: 93 | 3.4 | 720 | 780 | 265 | 4.9 | PF + P | PF: 95 | 10.6 | 389 | 437 | 45 | 115 | 6.8 | Comparative example |
| A22 | E | QPF + B + C | QPF: 93 | 3.4 | 720 | 780 | 265 | 4.9 | QPF + B + C | QPF: 93 | 3.2 | 712 | 800 | 38 | 289 | 3.6 | Example |
| A23 | E | QPF + B + C | QPF: 93 | 3.4 | 720 | 780 | 265 | 4.9 | QPF + B + C | QPF: 93 | 3.7 | 706 | 806 | 37 | 268 | 3.9 | Example |
| A24 | E | QPF + B + C | QPF: 93 | 3.4 | 720 | 780 | 265 | 4.9 | QPF + B + C | QPF: 93 | 3.7 | 706 | 806 | 17 | 468 | 1.2 | Example |
| A25 | E | QPF + B + C | QPF: 93 | 3.4 | 720 | 780 | 265 | 4.9 | QPF + B + C | QPF: 88 | 12.8 | 714 | 802 | 44 | 89 | 8.6 | Comparative example |
| A26 | F | QPF + B + C | QPF: 93 | 3.3 | 623 | 672 | 285 | 4.9 | PF + P | PF: 93 | 10.3 | 394 | 437 | 45 | 135 | 6.4 | Comparative example |
| A27 | F | QPF + B + C | QPF: 93 | 3.3 | 623 | 672 | 285 | 4.9 | QPF + B + C | QPF: 93 | 4.6 | 594 | 669 | 38 | 300 | 3.7 | Example |
| A28 | F | QPF + B + C | QPF: 93 | 3.3 | 623 | 672 | 285 | 4.9 | QPF + B + C | QPF: 93 | 4.6 | 587 | 661 | 38 | 302 | 3.6 | Example |

TABLE 5-continued

| Steel pipe No. | Steel No. | Base steel portion ||||||| Electric resistance welded portion |||||||  Note |
|---|---|---|---|---|---|---|---|---|---|---|---|---|---|---|---|---|
| | | Structure || Tensile properties ||| | HIC | Structure || Tensile properties ||| Total alloy amount in inclusions (ppm)** | | |
| | | Type* | Percentage (% by area) | Grain size (μm) | Yield strength YS (MPa) | Tensile strength TS (MPa) | Toughness vE$_{-50}$ (J) | resistance CAR (%) | Type* | Percentage (% by area) | Grain size (μm) | Yield strength YS (MPa) | Tensile strength TS (MPa) | | Toughness vE$_{-50}$ (J) | HIC resistance CAR (%) | |
| A29 | F | QPF + B + C | QPF: 93 | 3.3 | 623 | 672 | 285 | 4.9 | QPF + B + C | QPF: 91 | 4.3 | 605 | 680 | 42 | 245 | 4.2 | Example |
| A30 | F | QPF + B + C | QPF: 93 | 3.3 | 623 | 672 | 285 | 4.9 | QPF + B + C | QPF: 77 | 4.1 | 656 | 737 | 42 | 105 | 7.4 | Comparative example |

Underline refers to the outside of the scope of the present invention.
*QPF: quasi-polygonal ferrite, PF: polygonal ferrite, B: bainite, P: perlite, QP: quasi-perlite, C: cementite, M: martensite
**Total amount of Si, Mn, Al, Ca, and Cr in inclusions having an equivalent circular diameter of 2 μm or more (mass ppm)

The base steel portion and the electric resistance welded portion in the examples have a microstructure in which fine quasi-polygonal ferrite having a grain size $d_\alpha$ of 10 μm or less occupies 90% by area or more. The electric resistance welded steel pipes according to the examples have high strength represented by a yield strength YS of 400 MPa or more, excellent low-temperature toughness represented by a Charpy impact absorbed energy $vE_{-50}$ of 150 J or more at −50° C., and excellent HIC resistance represented by a crack area ratio CAR of 5% or less after immersion in a NACE Solution A specified in NACE TM0284 for 96 hours. The remainder other than quasi-polygonal ferrite were pearlite, quasi-pearlite, cementite, bainite, and martensite, which occupies less than 10% by area in total.

The comparative examples do not have the desired high strength or have deteriorated low-temperature toughness or deteriorated HIC resistance.

In the comparative example (steel pipe No. A2) in which the heating temperature of the hot-rolling was higher than our range, the comparative example (steel pipe No. A5) in which the rolling reduction in the unrecrystallization temperature range in the hot-rolling was lower than our range, and the comparative example (steel pipe No. A16) in which the cooling rate after the hot-rolling was lower than our range, the base steel portion has a coarse microstructure and has deterioration of low-temperature toughness. In the comparative example (steel pipe No. A3) in which the heating temperature of the steel in the hot-rolling was lower than our range, the comparative example (steel pipe No. A4) in which the heating holding time of the steel in the hot-rolling was lower than our range, and the comparative example (steel pipe No. A20) in which the cooling rate after the hot-rolling was higher than our range, the base steel portion has deterioration of HIC resistance.

In the comparative examples (steel pipes Nos. A11 and A21) in which the heating temperature in the heat treatment was lower than our range and the comparative examples (steel pipes Nos. A6 and A26) in which the cooling rate after the heating in the heat treatment was lower than our range, the electric resistance welded portion has a coarse microstructure and has deterioration of strength and deterioration of low-temperature toughness. In the comparative examples (steel pipes Nos. A15 and A25) in which the heating temperature in the heat treatment was higher than our range and the comparative examples (steel pipes Nos. A10 and A30) in which the cooling rate after the heating in the heat treatment was higher than our range, the electric resistance welded portion has a microstructure that is different from the desired microstructure composed of fine quasi-polygonal ferrite and has deterioration of low-temperature toughness and deterioration of HIC resistance.

In the example (steel pipe No. A14) in which a groove was formed in the ends of the steel strip in the width direction in the electric resistance welding and the example (steel pipe No. A24) in which the atmosphere was controlled in the electric resistance welding, the total amount of Si, Mn, Al, Ca, and Cr in the inclusions having an equivalent circular diameter of 2 μm or more contained in the electric resistance welded portion is as small as 20 mass ppm or less, and the electric resistance welded portion has significantly improved low-temperature toughness with the $vE_{-50}$ being 400 J or more. The example (steel pipe No. A28) in which the heating and cooling were followed by tempering at 450° C. for 1 min in the heat treatment also has excellent low-temperature toughness and excellent HIC resistance.

The invention claimed is:

1. A high-strength thick-walled electric resistance welded steel pipe having excellent low-temperature toughness and excellent HIC resistance comprising:
   a base metal composition consisting of, on a mass percent basis,
      C: 0.025% to 0.084%, Si: 0.10% to 0.30%,
      Mn: 0.70% to 1.80%, P: 0.001% to 0.018%,
      S: 0.0001% to 0.0029%, Al: 0.01% to 0.10%,
      Nb: 0.001% to 0.065%, V: 0.001% to 0.065%,
      Ti: 0.001% to 0.033%, Ca: 0.0001% to 0.0035%,
      N: 0.0050% or less, O: 0.0030% or less, and
      optionally, one or more selected from the group consisting of B: 0.0030% or less, Cu: 0.001% to 0.350%, Ni: 0.001% to 0.350%, Mo: 0.001% to 0.350%, and Cr: 0.001% to 0.700% and the remainder being Fe and incidental impurities,
   wherein Pcm defined by formula (1) is 0.20 or less, $$Pcm = C + Si/30 + Mn/20 + Cu/20 + Ni/60 + Cr/20 + Mo/15 + V/10 + 5B \quad (1)$$

wherein C, Si, Mn, Cu, Ni, Cr, Mo, V, and B denote amounts (mass %) of corresponding elements,
   a microstructure which includes 90% by area or more of quasi-polygonal ferrite having a grain size of 10 μm or less in each of a base steel portion and an electric resistance welded portion of the steel pipe,
   a yield strength YS of 400 MPa or more,
   and
   an absorbed energy $vE_{-50}$ of 150 J or more at −50° C. in a Charpy impact test,
   wherein the electric resistance welded steel pipe is formed by rounding a steel strip having the base metal composition to form a butt joined seam by electronic resistance welding.

2. The welded steel pipe according to claim 1, wherein the total amount of Si, Mn, Al, Ca, and Cr in inclusions having an equivalent circular diameter of 2 μM or more contained in the electric resistance welded portion is 0.0089% or less on a mass percent basis.

3. A method of manufacturing a high-strength thick-walled electric resistance welded steel pipe having excellent low-temperature toughness and excellent HIC resistance, comprising:
   a hot-rolling step of producing a hot-rolled steel strip from steel by heating, hot-rolling, cooling, and coiling,
   a pipe-forming step of continuously roll-forming the hot-rolled steel strip after the hot-rolling step to form a tubular product having a substantially circular cross section and
   butt-welding circumferential ends of the tubular product by electric resistance welding to produce an electric resistance welded steel pipe, wherein
   the steel has a chemical composition consisting of C: 0.025% to 0.084%, Si: 0.10% to 0.30%,
      Mn: 0.70% to 1.80%, P: 0.001% to 0.018%,
      S: 0.0001% to 0.0029%, Al: 0.01% to 0.10%,
      Nb: 0.001% to 0.065%, V: 0.001% to 0.065%,
      Ti: 0.001% to 0.033%, Ca: 0.0001% to 0.0035%,
      N: 0.0050% or less, O: 0.0030% or less on a mass percent basis, and
      optionally, one or more selected from the group consisting of B: 0.0030% or less, Cu: 0.001% to 0.350%, Ni: 0.001% to 0.350%, Mo: 0.001% to 0.350%, and Cr: 0.001% to 0.700% and the remainder being Fe and incidental impurities, wherein Pcm defined by formula (1) is 0.20 or less, $$Pcm=C+Si/30+Mn/20+Cu/20+Ni/60+Cr/20+Mo/15+V/10+5B \qquad (1)$$

wherein C, Si, Mn, Cu, Ni, Cr, Mo, V, and B denote the amounts (mass %) of the corresponding elements, the hot-rolling step is performed by heating the steel to a temperature of 1200° C. to 1280° C., maintaining the temperature for 90 min or more, hot-rolling the steel at a hot-rolling reduction of 20% or more in an unrecrystallized austenite region, after completion of the hot-rolling, cooling the steel to a finish cooling temperature of 630° C. or less at a cooling rate of 7° C./s to 49° C./s, the cooling rate being an average cooling rate at a temperature from 780° C. to 630° C. at a central portion in the thickness direction, and coiling the steel at a coiling temperature of 400° C. or more and less than 600° C., the pipe-forming step is followed by a heat treatment that includes heating the electric resistance welded portion of the electric resistance welded steel pipe on a production line such that the electric resistance welded portion has a temperature of 800° C. to 1150° C. over the total wall thickness, then cooling the electric resistance welded portion to a finish cooling temperature of 630° C. or less at a cooling rate of 7° C./s to 49° C./s, the cooling rate being the average cooling rate at a temperature from 780° C. to 630° C. at the central portion in the thickness direction, and then allowing the electric resistance welded portion to air-cool, and the base steel portion and the electric resistance welded portion of the electric resistance welded steel pipe have a yield strength YS of 400 MPa or more and an absorbed energy $vE_{-50}$ of 150 J or more at −50° C. in a Charpy impact test.

4. The method according to claim 3, further comprising forming a tapered groove in end faces of the hot-rolled steel strip in the width direction by fin pass forming during the roll-forming in the pipe-forming step, a distance between a taper starting position of the tapered groove and a surface that will become a pipe outer surface or a surface that will become a pipe inner surface in the steel strip thickness direction is 2% to 60% of the hot-rolled steel strip thickness.

5. The method according to claim 4, wherein atmospheric oxygen partial pressure in the electric resistance welding in the pipe-forming step is adjusted at $900/f_{oxy}$ mass ppm or less, and the $f_{oxy}$ represents a degree of oxidizability of molten steel defined by formula (2), $$f_{oxy}=Mn+10(Si+Cr)+100Al+1000Ca \qquad (2)$$

wherein Mn, Si, Cr, Al, and Ca denote the amounts (mass %) of the corresponding elements.

6. The method according to claim 3, wherein atmospheric oxygen partial pressure in the electric resistance welding in the pipe-forming step is adjusted at $900/f_{oxy}$ mass ppm or less, and the $f_{oxy}$ represents a degree of oxidizability of molten steel defined by formula (2), $$f_{oxy}=Mn+10(Si+Cr)+100Al+1000Ca \qquad (2)$$

wherein Mn, Si, Cr, Al, and Ca denote the amounts (mass %) of the corresponding elements.

7. The method according to claim 3, wherein the cooling in the heat treatment includes installing at least two lines of cooling headers in a conveying direction above the electric resistance welded portion, the cooling headers being coupled to a nozzle through which a rod-like flow of cooling water can be ejected at a water flow rate of 1 m³/m²·min or more, and ejecting the rod-like flow of cooling water through the nozzle at a rate of 1 m/s or more.

8. The method according to claim 7, wherein the plurality of cooling headers are configured to independently control the ejection of cooling water.

* * * * *